Dec. 8, 1964  C. SAVAGE  3,160,232
FLOOR SELECTOR FOR AN ELEVATOR CONTROL SYSTEM
Filed July 31, 1962  8 Sheets-Sheet 1

WITNESSES
Robert C. Baird
Edwin E. Bashor

INVENTOR
Conwell Savage
BY S. J. Reisman
ATTORNEY

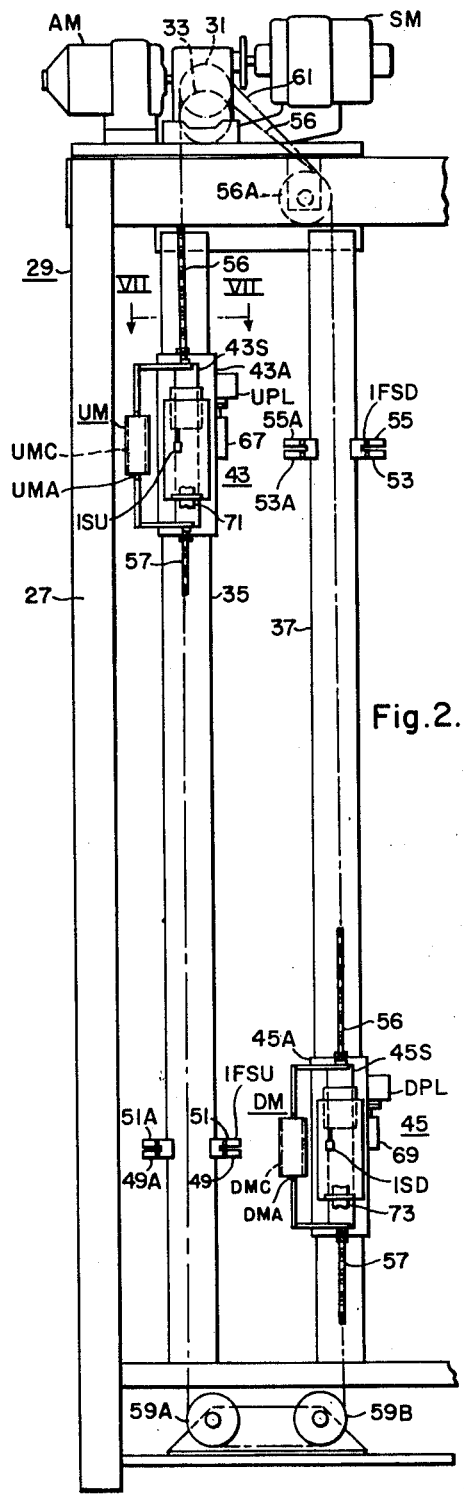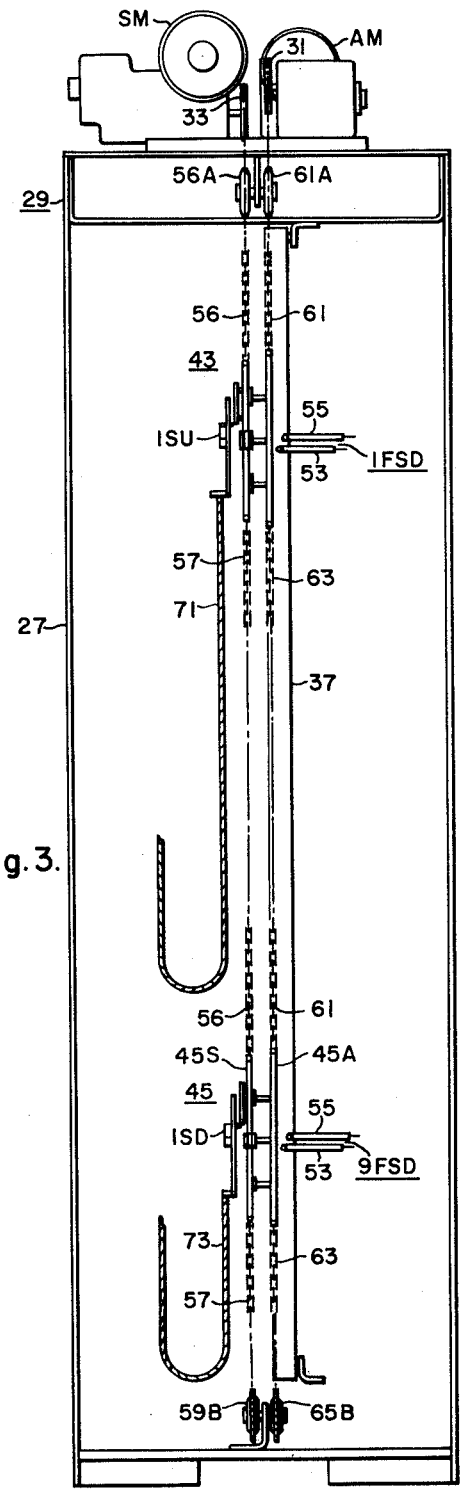
Fig.2.
Fig.3.

Dec. 8, 1964     C. SAVAGE     3,160,232
FLOOR SELECTOR FOR AN ELEVATOR CONTROL SYSTEM
Filed July 31, 1962     8 Sheets-Sheet 3

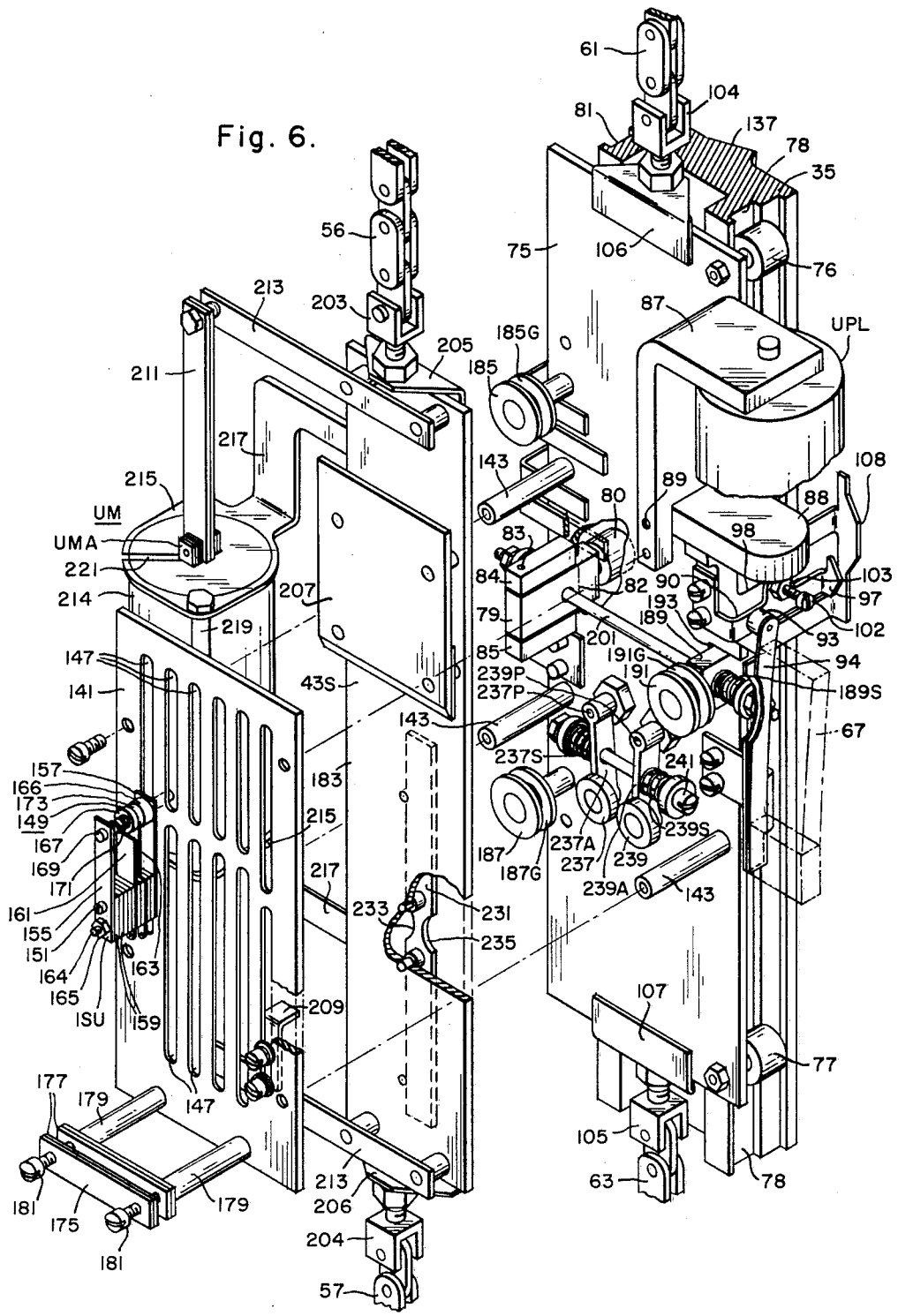

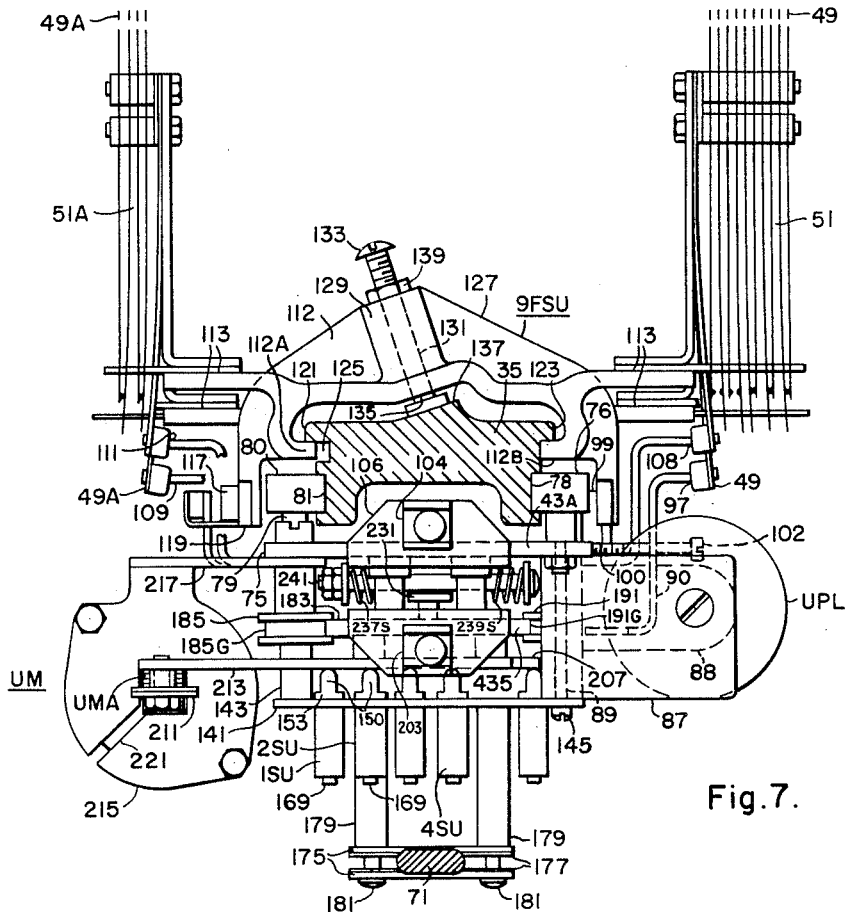
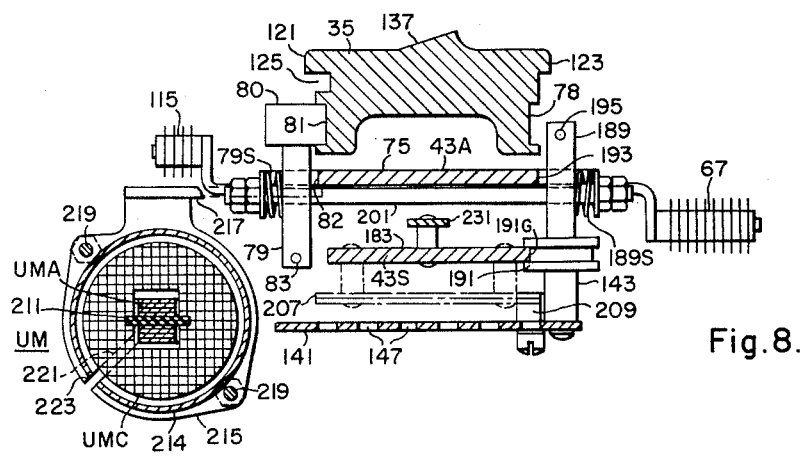

United States Patent Office 3,160,232
Patented Dec. 8, 1964

3,160,232
FLOOR SELECTOR FOR AN ELEVATOR
CONTROL SYSTEM
Conwell Savage, New York, N.Y., assignor to Westinghouse Electric Corporation, East Pittsburgh, Pa., a corporation of Pennsylvania
Filed July 31, 1962, Ser. No. 213,786
19 Claims. (Cl. 187—29)

This invention relates to elevator systems, and it has particular relation to mechanisms and systems for controlling the starting and stopping of elevator cars.

Although the invention may be employed in whole or in part with various types of elevator systems, it is particularly suitable for elevator systems wherein an elevator car stops automatically in response to calls for service. The calls for service may be registered by means of car call buttons positioned within the elevator car or by means of floor call buttons operated by waiting passengers at the various floors served by the elevator car.

The elevator system may be of the automatic type wherein an elevator car starts automatically in response to registration of a call for service. However, the invention also is suitable for an attendant-operated elevator system wherein an attendant in the elevator car must perform some function in order to permit the car to start for the purpose of answering a call for service.

The invention is directed particularly to a floor selector for an elevator system. Although the floor selector may control the entire slowdown and stopping operation of an elevator car, preferably the floor selector is employed for controlling the preliminary or initial slowdown of the car. In a preferred embodiment of a system employing the floor selector, deceleration of the elevator car as it completes its approach to each of the floors, the stopping point for each of the floors and leveling operations are controlled by highly accurate equipment located on the elevator car and in the hoistway within which the car operates.

The floor selector includes a pair of carriage units which move in opposite directions. Conveniently, one of the carriage units, termed an up carriage unit, may be employed primarily for control operations required during up travel of the elevator car. The remaining or down carriage unit may be employed primarily for control operations required for down travel of the car.

Each of the carriage units comprises a synchronous carriage, which is moved in accordance with movement of the elevator car, and an advance or lead carriage, which is connected to the synchronous carriage through a lost-motion coupling. Preferably, the two synchronous carriages are connected in a flexible loop. Similarly, the advance carriages preferably are associated in a flexible loop. Drive units for the two flexible loops then may be associated with a common supporting structure. After each stop of the elevator car, the synchronous carriages preferably are reset or accurately positioned with respect to the advance carriages.

In accordance with the invention, each of the carriage units is mounted on a support in the form of only a single independent guide element or rail. Each of the aforementioned advance carriages comprises a plate which is parallel to its associated rail. Mounted on the plate are a plurality of rollers which cooperate with grooves in opposite sides of the rail for guiding the carriage unit. Each synchronous carriage also comprises a plate which is parallel to its associated advance carriage plate. This plate is supported and guided for movement by a plurality of rollers mounted on the advance carriage plate.

Floor-stop points are determined by simple and effective blocks or clamps which preferably are secured to the same rails employed for guiding the carriage units. The clamps are positioned accurately by means of cooperating clamp legs and rail flanges or shoulders. The same clamps preferably are employed for supporting switches associated with each of the floors served by the elevator car. Such switches are operated by cams secured to the advance carriages. Inasmuch as the clamps are secured to the same rails employed for guiding the carriage units, correct alignment between the carriage units and the components secured to the clamps is assured. Each of the clamps also may include a cam which operates a control switch carried by the associated advance carriage.

In a floor selector constructed in accordance with the invention, a slight camber or twist of a carriage unit guide rail does not adversely affect operation of the selector. In addition, the switches supported by the clamps secured to a guide rail will not have varying operating points as a result of shifting of the horizontal position of the associated carriage unit.

In a preferred embodiment of the invention, the synchronous carriages carry no switches. Each synchronous carriage has a cam for operating switches secured to a plate mounted on the associated advance carriage.

Desirably, initial deceleration of the elevator car also is regulated by control units having relatively movable parts mounted on the advance and synchronous carriages. Thus, each carriage unit may include a solenoid control unit having a coil mounted on the advance carriage plate and a magnetic armature or core which is mounted on the associated synchronous carriage plate. Consequently, the impedance of the coil varies in response to relative movement of the advance and synchronous carriages as a result of corresponding relative movement of the coil and its armature.

It is, therefore, a first object of the invention to provide an improved floor selector for controlling operation of an elevator car.

It is a second object of the invention to provide an improved elevator floor selector comprising a pair of carriage units, each carriage unit being mounted for movement along a support comprising only a single independent guide rail.

It is a third object of the invention to provide a floor selector as specified in the preceding object, wherein floor-stop points are determined by clamps secured to such guide rail.

It is a fourth object of the invention to provide an elevator floor selector having a carriage unit including an advance and a synchronous carriage which are coupled to each other through a lost-motion coupling and in which the advance and synchronous carriages comprise parallel plates.

It is a fifth object of the invention to provide an elevator floor selector as defined in the preceding paragraph, wherein the synchronous carriage operates switches secured to a plate parallel to and mounted on the advance carriage.

It is a sixth object of the invention to provide a floor selector as defined in the fourth object, in which the advance carriage plate is mounted by means of rollers for movement parallel to a single independent guide rail and the synchronous carriage is supported and guided for movement on rollers mounted on the advance carriage.

Other objects of the invention will be apparent from the following description taken in conjunction with the accompanying drawings, in which;

FIG. 2 is a view in front elevation with parts broken away of a floor selector suitable for the system of FIG. 1;

FIG. 3 is a view in side elevation with parts broken away of the floor selector illustrated in FIG. 2;

FIG. 6 is an exploded isometric view of the carriage unit shown in FIG. 4;

FIG. 7 is a view taken along the line VII—VII of FIG. 2;

FIG. 8 is a view taken along the line VIII—VIII of FIG. 4;

GENERAL SYSTEM

Although the invention may be employed in various types of elevator control systems, the control system herein described is similar to that disclosed in the Oplinger Patent 2,874,806. Thus, FIGS. 1, 12 and 13 of the present application respectively are based on FIGS. 1, 4A and 4 of the aforesaid Oplinger patent, additions being indicated in the present FIG. 12 by extra-heavy lines.

Figure 1:
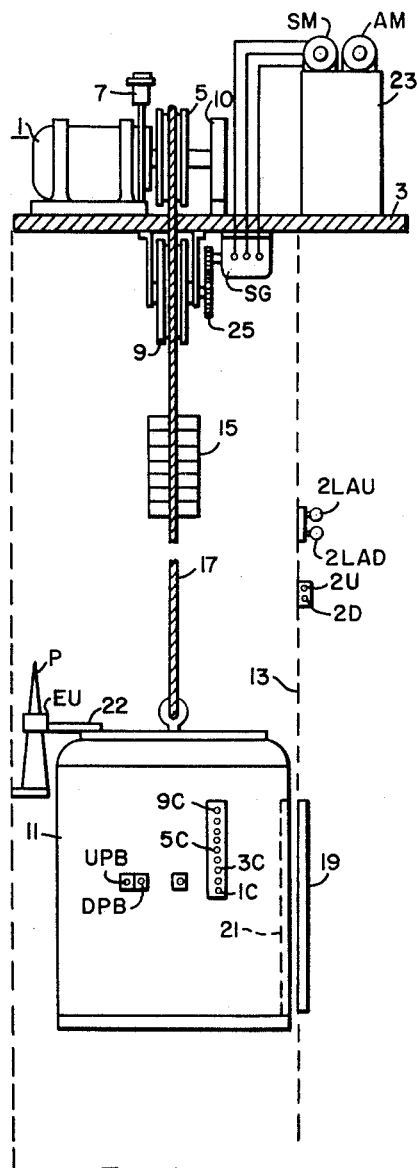
FIGURE 1 is a schematic view with parts shown in elevation and parts in cross-section of an elevator system embodying the invention.

Referring to FIG. 1, an elevator motor 1 is secured to the upper surface of a floor 3 which may be located in the penthouse of a building being served by the elevator system. The motor 1 has a traction sheave 5 secured to its shaft, and an elevator brake 7 is associated with the elevator motor and the traction sheave in a conventional manner.

As will be pointed out below, the brake 7 is spring applied to hold the traction sheave 5 stationary and is released in response to energization of a solenoid. A secondary or idler sheave 9 my be secured to the lower surface of the penthouse floor 3. A control unit 10 is operated by the shaft of the motor 1. This control unit is employed in controlling the speed of the motor 1 and will be discussed below.

An elevator car 11 is mounted for movement in a hoistway 13 to serve the various floors of the building associated therewith. The elevator car is connected to a counterweight 15 by means of one or more ropes or cables 17 which pass around the traction sheave 5 and the secondary sheave 9 in a conventional manner.

At each floor served by the elevator car, a hoistway or floor door 19 is provided. In addition, the elevator car has a gate 21 which registers with the hoistway door at any floor at which the elevator car is stopped. The doors and the gate may be of conventional construction and may be operated automatically in any conventional way. However, for present purposes, it will be assumed that the gate and doors are opened and closed by an elevator car attendant.

In order to register calls for floors desired by passengers traveling in the elevator car, a plurality of car call push buttons 1C through 9C are provided. It is assumed that the building serviced by the elevator car has 9 floors requiring service. The car also contains an up push button UPB and a down push button DPB which are operated by the car attendant in order to condition the elevator car for up travel or down travel, respectively.

As is illustrated in FIG. 1, an up push button 2U is provided at the second floor for operation by a person desiring transportation in the up direction. A similar push button would be provided at each of the floors from which a person may desire to travel in the up direction. Hereinafter each such push button will be identified by the reference character U preceded by a number corresponding to the floor at which the button is located. In a similar manner, FIG. 1 shows a down push button 2D which may be operated by a person desiring to travel in the down direction. A similar push button would be located at each floor from which a person may desire transportation in the down direction.

In order to signal the approach and direction of an elevator car to prospective passenger, suitable floor signals such as lanterns may be provided. Thus, in FIG. 1, an up floor lantern 2LAU and a down floor lantern 2LAD are illustrated. Similar lanterns may be provided at each floor requiring such signals.

As the elevator car approaches a floor at which it is to stop, it is desired that the car stop automatically and accurately in registration with the floor. To this end, position-responsive mechanism is provided in the hoistway and on the elevator car. Thus, FIG. 1 shows an electromagnetic unit EU mounted on a bracket 22 which is secured to the elevator car. A separate inductor plate or vane P constructed of magnetic material such as steel is located in the hoistway for each of the floors served by the car. When the car is accurately stopped at a floor, the unit EU is associated with the plate P for such floor in the manner illustrated in FIG. 1. For further details of construction of the unit EU and the plate P, reference may be made to the aforesaid Oplinger Patent 2,874,806. The application of the unit EU will be discussed further in connection with FIGS. 12 and 13 below.

Further control of the operation of the elevator car is provided by a floor selector 23 (FIG. 1) which conveniently may be mounted on the penthouse floor 3. This floor selector is supplied with two drive inputs. One is a drive input by an advance motor AM located on the top of the floor selector. A second drive input is supplied for the purpose of driving the floor selector in accordance with movement of the elevator car. Such a drive input may be provided in any desired manner. For example, a drive tape may be provided in a known manner for mechanically driving the selector unit in accordance with movement of the elecator car. However, in FIG. 1, a preferred drive of the self-synchronous type is provided. Such a drive includes a transmitter or generator SG which is connected electrically to a receiver or motor SM. The transmitter or generator SG is coupled to the secondary sheave 9 or the traction sheave 5 through suitable gearing 25. A self-synchronous drive of this type together with a suitable advance drive are described in detail in the Savage Patent 2,657,765.

FLOOR SELECTOR

The floor selector is illustrated in greater detail in FIGS. 2 through 11. Referring first to FIGS. 2 and 3, it will be noted that a plurality of angles 27 and other structural parts are associated in any suitable manner to provide a rigid framework or supporting structure 29.

As previously pointed out, two drive inputs are supplied to the floor selector. One of the drive inputs is supplied by the advance motor AM, which is mounted on top of the floor selector supporting structure 29 and which drives a sprocket wheel 31 through a slip coupling. The motor SM also is mounted on top of the supporting structure 29 and drives a sprocket wheel 33 through a releasable coupling. These slip and releasable couplings are fully described in the aforesaid Savage patent. It will be noted that the sprocket wheels 31 and 33 are parallel to each other and are mounted for rotation about parallel axes.

The supporting structure 29 also supports two spaced parallel guide elements or rails 35 and 37, which are employed in part for guiding two carriage units 43 and 45, respectively. The rails 35 and 37 may be fabricated of a suitable material such as aluminum which is extruded to have the desired uniform cross section to be described below.

Certain control operations are performed by the carriage units 43 and 45 as the elevator car moves in its hoistway. When the car is to be brought to a stop at a desired floor, the carriage units also are brought to a stop at predetermined points corresponding to the desired floor. In order to perform the desired operations, a plurality of floor-stop units are provided. Certain of the floor-stop units are secured to the rail 37 and are employed primarily during down travel of the elevator car. These units will be designated by the reference character FSD preceded by the number of the floor corresponding to the stop unit. Thus, the reference character 9FSD designates the stop unit for the ninth floor associated with the rail 37. Although stop units are shown only for the first and ninth floors in FIGS. 2 and 3, it will be understood that similar stop units will be provided between the illustrated stop units for the intermediate floors. The stop units associated with the rail 35 are employed primarily for up travel of the elevator car and will be designated by the reference character FSU preceded by the number of the floor corresponding to the stop unit. It is to be understood, however, that certain parts of the carriage units 43 and 45 move in unison, and the floor-stop units associated with the rails 35 and 37 may be employed for certain functions during travel of the elevator car in either direction.

Each of the floor-stop units associated with the guide rail 35 includes a first set of pile-up switches 49, a second set of pile-up switches 51, a third set of pile-up switches 49A, a fourth set of pile-up switches 51A and clamping means for securing these switches to the associated guide rail. Each of the floor-stop units also includes a lug which under certain conditions may be employed for stopping the associated carriage unit 43 when a stop is to be made at the associated floor by the elevator car. In addition, each floor-stop unit has a cam for operating a set of pile-up switches secured to the carriage unit 43. The construction of the floor-stop units will be discussed in greater detail below. In a similar manner, each of the floor-stop units associated with the guide rail 37 includes a set of pile-up switches 53, a set of pile-up switches 55, a set of pile-up switches 53A, a set of pile-up switches 55A, a lug which under certain conditions is utilized for stopping the associated carriage unit 45 when the elevator car is to stop at the associated floor and a cam for operating a set of pile-up switches secured to the carriage unit 45.

The carriage unit 43 is divided into two main parts comprising a synchronous carriage 43S and an advance or lead carriage 43A. In an analogous manner, the carriage unit 45 includes a synchronous carriage 45S and an advance carriage 45A.

The synchronous carriages 43S and 45S are moved in opposite directions in accordance with movement of the associated elevator car. In the preferred embodiment of the invention illustrated in the drawings, the synchronous carriages 43S and 45S are connected in a flexible loop by means of flexible members such as chains 56 and 57. The chain 56 has its ends connected respectively to the upper ends of the synchronous carriages and passes around the sprocket wheel 33, which is driven by the synchronous motor SM, and an idler sprocket wheel 56A. The ends of the chain 57 respectively are connected to the lower ends of the synchronous carriages, and this chain passes around a pair of idler sprocket wheels 59A and 59B. By inspection of FIGS. 2 and 3, it will be observed that the synchronous carriages are driven in opposite directions by the motor SM in accordance with movement of the associated elevator car.

The advance carriages 43A and 45A similarly are associated for movement in opposite directions by means of chains 61 and 63. The chain 61 has its ends connected to the upper ends of the advance carriages and passes around the sprocket wheel 31, which is driven by the advance motor AM, and an idler sprocket wheel 61A. The chain 63 has its ends connected to the lower ends of the advance carriages and passes around a pair of idler sprocket wheels 65A (not shown) and 65B.

The advance carriages are connected to the synchronous carriages by means of a lost-motion coupling. Consequently, they move in unison with the synchronous carriages except for such relative movement as is permitted by the lost-motion coupling. The advance motor under certain conditions may move the advance carriages relative to the synchronous carriages by the distance permitted by the lost-motion coupling.

The advance carriage 43A carries an up pawl relay UPL which operates a set of pile-up switches 67. As hereinafter pointed out, energization of the coil of the relay also projects a stop pawl into a position to engage the lug of one of the floor-stop units during up travel of the elevator car, and such energization also projects a cam into position for operating certain of the switches carried by one of the floor-stop units. In addition, the advance carriage 43A carries switches (one of which 1SU is illustrated in FIGS. 2 and 3) which are operated in response to relative movement of the advance and synchronous carriages 43A and 43S. The construction of these various parts will be discussed in greater detail below.

In an analogous manner, the advance carriage 45A carries a down pawl relay DPL which operates a set of pile-up switches 69. Energization of the coil of this relay also projects a pawl into position to engage the lug of one of the associated floor-stop units during down travel of the elevator car, and projects a cam into position to engage certain of the pile-up switches carried by one of the floor-stop units. In addition, the advance carriage 45A carries switches (one of which 1SD is illustrated in FIGS. 2 and 3) which are operated in response to relative movement of the advance and synchronous carriages 45A and 45S.

Inasmuch as connections must be made between switches mounted on the advance carriages and external circuits, a pair of flexible cables 71 and 73 are provided. Each of the conductors in the cable 71 has an end connected to an appropriate switch mounted on the advance carriage 43A. Certain of the conductors also are connected to the coil of the relay UPL. The remaining ends of the conductors are connected to external circuits, as desired. Sufficient play is provided to permit the flexible cable 71 to follow or trail the advance carriage 43A without interfering with the motion thereof. The cable 73 similarly is associated with the advance carriage 45A.

It may be pointed out that the carriage unit 43 is effective for stopping the elevator car only while the carriage unit is traveling in an up direction. The parts are so arranged that the carriage unit 45 also is effective for a stopping operation only while traveling in the up direction. For this reason, the floor-stop units 1FSU and 1FSD are located at opposite ends of the floor selector.

The present selector also includes two solenoid control units UM and DM, which are employed for controlling deceleration, and, if desired, acceleration of the elevator car. The solenoid control unit UM includes a coil UMC, which is mounted on the advance carriage 43A, and a soft magnetic armature UMA, which is mounted on the synchronous carriage 43S of the selector. Consequently, relative movement of the advance and synchronous carriages results in movement of the armature UMA relative to the coil UMC for the purpose of varying the impedance thereof. In a similar manner, the solenoid control unit DM includes a coil DMC, which is mounted on the advance carriage 45A, and a soft magnetic armature DMA is mounted on the synchronous carriage 45S. Relative movement of the carriages 45A and 45S results in variation in the impedance of the unit DM. The units UM and DM will be described in greater detail hereinafter.

Figures 4, 5:
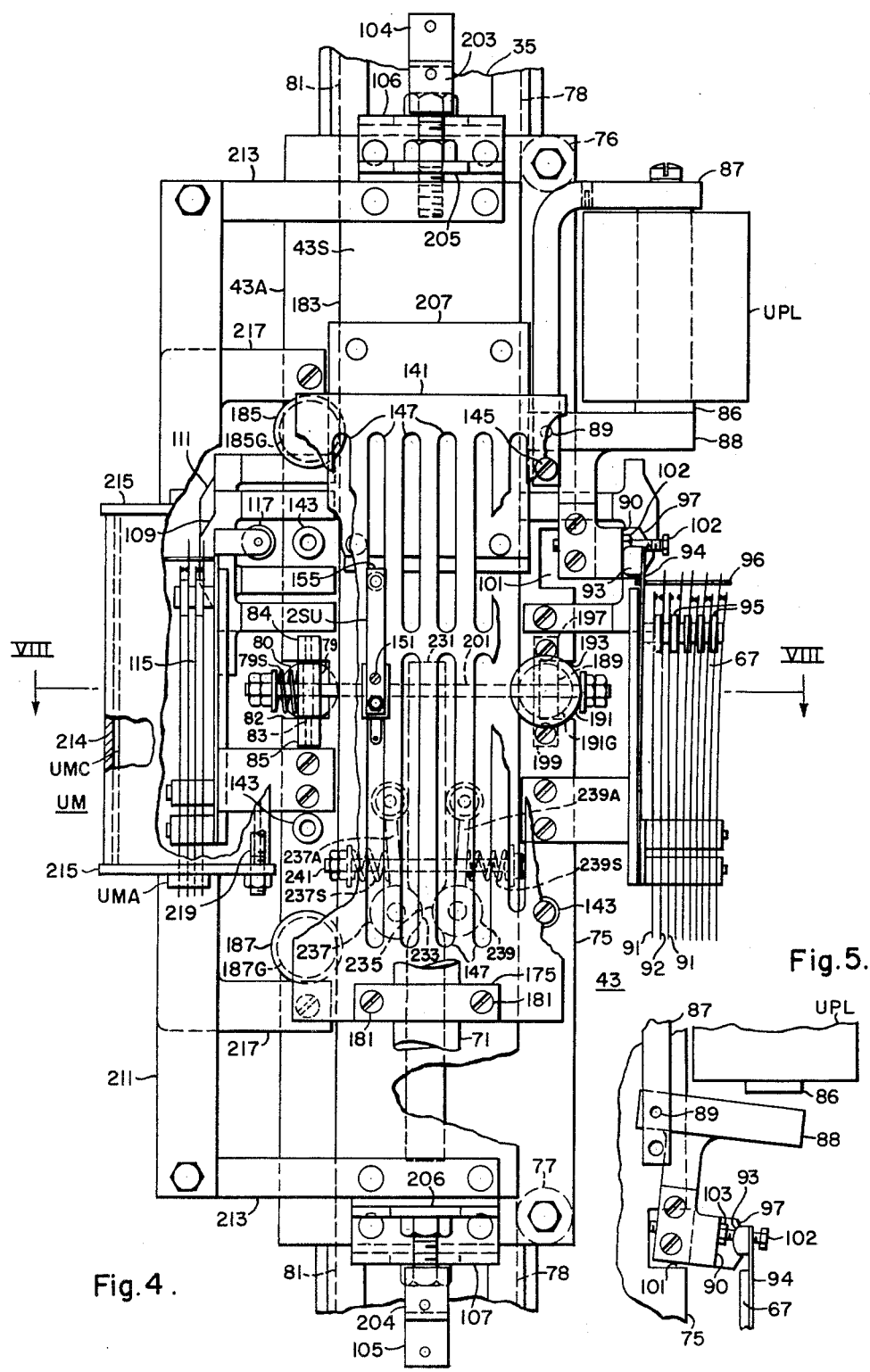
FIG. 4 is a view in front elevation of a carriage unit suitable for the floor selector of FIG. 2.
FIG. 5 is a view with parts broken away and parts not shown of a portion of the carriage unit illustrated in FIG. 4.

Referring more particularly to the FIGS. 4 and 6, it will be noted that the advance carriage 43 includes a body in the form of a rigid plate 75, which may be fabricated of steel and which is spaced from and extends parallel to the rail 35. Spaced from the plate 75 and mounted on the rear of the plate near the right edge thereof, as viewed in FIG. 4, for rotation relative thereto about vertically-spaced parallel axes transverse to the plate are an upper roller 76 and a lower roller 77. Preferably, the axes of the rollers 76 and 77 are spaced equally from a horizontal centerline of the plate 75. These rollers are disposed to travel in a longitudinal groove 78 formed in the right side of the rail 35. Spaced from the plate 75 and mounted adjacent the left edge thereof on a block 79 for rotation relative thereto about an axis parallel to the axes of the rollers 76 and 77 is a roller 80. This roller is disposed to travel in a longitudinal groove 81 formed in the left side of the rail 35. Thus, the grooves 78 and 81 provide tracks for guiding the advance carriage 43 accurately along the guide rail 35. The rollers 76, 77 and 80 may be fabricated of any suitable material such as rubber or polyurethane.

The block 79 extends through a notch 82 in the plate 75 and is mounted for rotation about a vertically-extending pin 83, which passes through an aperture in the block and whose ends which are reduced in diameter, extend into respective apertures in a pair of posts 84 and 85. The posts 84 and 85, in turn, are mounted by any suitable means on the front side of the plate 75.

As is shown clearly in FIGS. 4 through 7, the up pawl relay UPL has a soft magnetic core 86, which is secured to a frame 87. The frame may be constructed of a soft magnetic material such as soft iron or steel, and the coil of the relay surrounds the magnetic core. The frame 87 is secured to the advance carriage plate 75. The relay UPL includes a soft magnetic armature 88, which is illustrated in FIGS. 4, 6 and 7 in its energized or picked up condition and in FIG. 5 in its deenergized or dropped out condition. The armature 88 is mounted on the frame 87 for rotation about a pin 89, the pin extending through apertures in the armature and in the frame and the plate 75. It will be noted that the armature 88 carries a cam arm 90 which is positioned to operate the set of pile-up switches 67.

The set of pile-up switches 67 is of conventional construction and includes a plurality of parallel electroconductive leaf springs 91 and 92, which carry contacts insulated from each other and which are biased to predetermined positions. In the specific embodiment of FIG. 4, the set of pile-up switches includes two sets of break contacts, which are open when the relay is in its energized or picked up condition. In addition, the set includes three sets of contacts of the make type, which engage each other when the relay is in the energized or picked up condition shown in FIGS. 4 and 6. However, any other arrangement of contacts may be employed if so desired. It will be noted that the set of pile-up switches includes a cam follower 93 which is positioned for engagement by the cam arm 90. The cam follower is biased toward the left, as viewed in FIG. 4, by means of a leaf spring 94. Consequently, when the relay is deenergized, the cam follower 93 moves to the left in order to permit return of the sets of contacts to the positions they occupy when the relay is deenergized. Insulating spacers 95 position the leaf springs 91 and 92 for the desired relationships of the contacts carried thereby. An insulating strip 96 has suitable apertures for receiving the end of one leaf spring 94 in order to transmit motion from the cam follower 93 to the various contact leaf springs.

The armature 88 of the up pawl relay UPL also has a cam 97 secured thereto. Conveniently, the cam arm 90 is extended to form the cam 97. When the up pawl relay is in its energized or picked up condition, the cam 97 is positioned to engage certain switches mounted on the floor-stop units. When the relay is in its deenergized condition, as is shown in FIG. 5, the cam 97 clears all of these switches.

Figure 10:
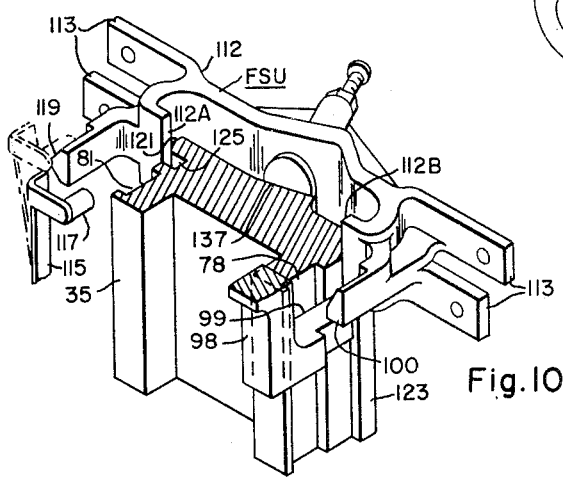
FIG. 10 is an isometric view with parts broken away and parts not shown illustrating a further association of the components illustrated in FIG. 9.

Referring to FIGS. 6, 7 and 10, the armature 88 also has an arm 98 which carries a stop pawl 99. When the relay UPL is in its energized or picked up condition, the stop pawl 99 is positioned to engage a stop lug on the next one of the floor-stop units reached by the pawl. In FIG. 7, the stop pawl 99 is positioned in engagement with the lug 100 carried by the clamp of the floor-stop unit 9FSU. It will be noted in FIGS. 4 and 5 that the advance carriage plate 75 has a notch 101 through which the arm 98 extends and which provides clearance sufficient to permit substantial movement of the arm without interference by the plate when the up pawl relay is deenergized or dropped out. An adjustment screw 102 is in threaded engagement with the cam arm 90 and when the relay UPL is deenergized, engages the inner wall of the notch 101 to determine the position of the armature 88. The screw 102 is retained securely in its adjusted position by means of locking nut 103.

It will be noted that the advance carriage has at its upper and lower ends adjustable sockets 104 and 105, which are in threaded engagement with respective brackets 106 and 107 secured to the plate 75. These sockets receive the ends of the chains 61 and 63, which are secured thereby to the advance carriage, as is shown in FIG. 6.

Figure 9:
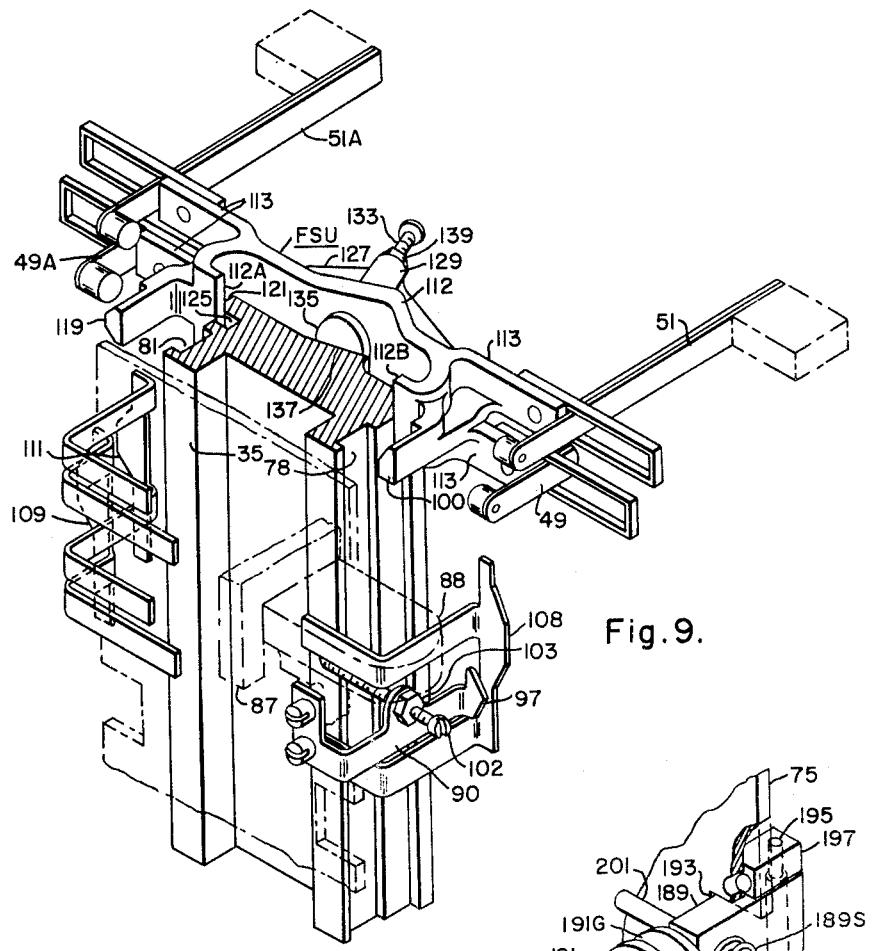
FIG. 9 is an isometric view with parts broken away and parts not shown illustrating the association of a floor unit, a carriage unit rail and certain portions of a carriage unit.

By reference to FIGS. 7 and 9, it will be noted that the movable cam 97 is positioned to operate the sets of pile-up switches 49 at predetermined points in the travel of the elevator car, provided the up pawl relay UPL is energized. An additional cam 108 is secured to the advance carriage plate 75. This cam is positioned to engage the set of pile-up switches 51 mounted on each floor-stop unit during travel of the elevator car. Since this cam is fixed to the advance carriage, it is always in position to engage these switches at predetermined points in the travel of the car.

Two additional fixed cams 109 and 111 (FIGS. 4, 7 and 9) are secured to the left side of the plate 75 of the advance carriage 43. These cams are positioned to cooperate respectively with the sets of pile-up switches 49A and 51A during travel of the elevator car.

The construction of the sets of pile-up switches 49, 51, 49A and 51A in FIGS. 7 and 9 will be understood from the description of the set 67 in FIG. 4. It will be apparent that in each set make and break contacts may be provided, as required. It also will be understood that the point of operation and the duration of operation of each of the sets of pile-up contacts may be determined by the position and length of the associated cam.

It will be observed that the sets of pile-up contacts 49, 51, 49A and 51A for each of the floor-stop units are secured to the clamp 112 for the same floor by means of ears 113 which project from the clamp body. As is shown, certain of the sets such as the sets 49 and 49A may be positioned slightly below the other sets 51 and 51A and may be slightly staggered with respect thereto.

Referring now to FIGS. 4, 7 and 10, the advance carriage plate 75 also has secured thereto a set of pile-up switches 115, whose construction is similar to that of the sets heretofore discussed. The set 115 has a cam follower 117, which is positioned to engage a cam 119 on the next one of the floor-stop units reached by the cam follower. In FIG. 7, the cam follower 117 is positioned in engagement with the cam 119 carried by the clamp 112 of the floor-stop unit 9FSU. By reference to FIG. 10, it will be noted that the cam 119 is designated to engage the cam follower 117 and thus to operate the set of pile-up switches 115 in both directions of travel of the carriage unit 43.

The clamp 112 (FIGS. 7, 9 and 10) is generally C-shaped and has two legs 112A and 112B. The rail 35 has a shoulder or flange 121 which is engaged by the clamp leg 112A and a shoulder or flange 123 which is engaged by the leg 112B. It will be noted that a groove or notch 125 is formed in the rail adjacent the shoulder 121. The legs and the shoulders are proportioned so that the leg 112A may be inserted into the notch 125 around the shoulder 121, after which the clamp 112 may be rotated sufficiently to pass the leg 112B around the outer end of the shoulder 123. Then the clamp may be moved to the left, as viewed in FIG. 7, to assume the position illustrated. To remove the clamp from the rail, the foregoing sequence is reversed.

For adjustably securing the clamp 112 to the associated rail, the clamp additionally includes a web 127 which has an oblique cylindrical portion 129. The portion 129 has an aperture 131, which is threaded to receive in the rear end thereof a screw 133. The body portion of a plunger 135 also is inserted into the aperture 131 through the front end thereof. Thus, the screw 133 may be adjusted to determine the length of the body portion of the plunger 135 which is received in the aperture 131.

It will be observed that the rail 35 has a longitudinally-extending rear oblique surface 137, which faces the external end surface of the plunger 135. Consequently, the clamp 112 may be adjusted along the guide rail 35, and the screw 133 thereafter may be rotated to locate the clamp accurately in any desired position of adjustment; i.e., as the screw 133 is tightened, the plunger 135 and the oblique rail surface 137 cooperate to draw the clamp legs 112A and 112B tightly against the shoulders 121 and 123, respectively, with the end of the leg 112B engaging the side surface of the rail 35 adjacent the shoulder 123, as is clearly shown in FIG. 7. A nut 139 is provided for locking the screw 133 in position to prevent loosening of the clamp 112 after the screw is tightened. Since the same guide rail is employed for guiding the advance carriage 43, it is apparent that proper alignment between the various parts is assured and that a slight camber or twist of the rail will not affect their operation.

By inspection of FIGS. 4, 6, 7 and 8, it will be noted that a switch plate 141 is secured to the advance carriage plate 75 by means of three spacers 143. A screw 145 secures the plate 141 to the frame 87 of the up pawl relay UPL. The switch plate 141 is parallel to the advance carriage plate 75 and has formed therein a plurality of longitudinally-extending slots 147. Because of its appearance, the plate 141 conveniently may be referred to as a cage plate.

The slots 147 are employed for adjustably positioning a plurality of cage switches, such as the switches 1SU and 2SU. Each switch body bridges its associated slot and has an operating plunger 149 formed of insulating material such as phenolic resin. An end of the plunger 149 extends through such slot to form a cam follower 150. Each switch may be secured to the plate 141 by any suitable means, such as a screw 151 and a nut 153, the latter of which also is sufficiently large to bridge the associated slot. Consequently, each switch may be adjusted in a vertical path to the proper position, and the screw 151 then may be tightened to clamp the switch securely to the plate 141 and thus to the advance carriage 43A.

As is clearly shown in FIG. 6, each of the cage switches includes a top plate 155 and a bottom plate 157. Disposed between these plates are plurality of insulating spacers 159 and a pair of leaf springs 161 and 163, each of which carries a contact. The top and bottom plates, the insulating spacers and the leaf springs are secured together by means of a screw 164 and a nut 165. The screws 151 and 165 are insulated from the leaf springs 161 and 163 by any suitable means such as by insulating tubing (not shown) surrounding the respective screw bodies.

The plunger 149 has a first shoulder 166 positioned against the bottom plate 157. Extending from this shoulder and through an aperture in the bottom plate 157 and one of the slots in the cage plate 141 is a pin-like projection which forms the aforementioned cam follower 150. The plunger 149 also has a second shoulder 167 spaced from the shoulder 165. Extending from the shoulder 167 is a pin-like projection 169, which is inserted through an aperture in the top plate 155. Surrounding the plunger projection 169 between the shoulder 167 and the top plate 155 is a helical spring 171 which biases the plunger toward the right to the position shown in FIG. 6.

It will be observed that the spacing between the plunger shoulders 165 and 167 provides a peripheral groove 173 in the plunger and that the leaf spring 163 extends into this groove. Thus, movement of the plunger 149 toward the left, as viewed in FIG. 6, results in movement of the leaf spring 163 in the same direction to close the switch contacts. While the switch 1SU is illustrated as of the make type, i.e., one whose contacts are normally open, it will be apparent that reversal of the respective positions of the leaf springs 161 and 163 will result in a switch of the break type, that is, one whose contacts are normally closed and are opened by movement of the switch plunger against the biasing of the helical spring 171. Although five cage switches are illustrated in FIG. 7, it will be understood that additional switches, as desired, may be secured to the cage plate 141 to operate in a similar manner.

The cage plate 141 also carries a suitable clamp for securing the flexible electrical cable 71 to the carriage unit 43. As is illustrated, this clamp may take the form of a pair of parallel bars 175, between which are disposed similarly shaped pieces of insulating material such as felt 177. The bars and the insulating material are mounted on spacers 179, and the cable 71 is retained securely between the former components by means of screws 181.

Referring again to FIGS. 4 and 6, it will be observed that the synchronous carriage 43S includes a body in the form of a rigid plate 183 which may be fabricated of steel. The plate 183 is disposed between, spaced from and parallel to the advance carriage plate 75 and the cage plate 141.

Spaced from the advance carriage plate 75 and mounted on the front of the plate adjacent the left-hand edge thereof, as viewed in FIG. 4, for rotation relative thereto about vertically spaced axes transverse to the plate are an upper roller 185 and a lower roller 187. Preferably, the axes of these rollers are spaced equally from the horizontal centerline of the plate 75. Spaced from the plate 75 and mounted adjacent the right-hand edge thereof on a block 189 for rotation relative thereto about an axis parallel to the axes of the rollers 185 and 187 is a roller 191. Each of the rollers 185, 187 and 191 has a peripheral groove 185G, 187G and 191G, respectively, for receiving and guiding the synchronous carriage plate 183. Consequently, the advance carriage 43A guides the synchronous carriage 43S for movement in a direction parallel to the rail 35. Conveniently, the rollers 185, 187 and 191 may be constructed of material having relatively low friction such as nylon.

Figure 11:
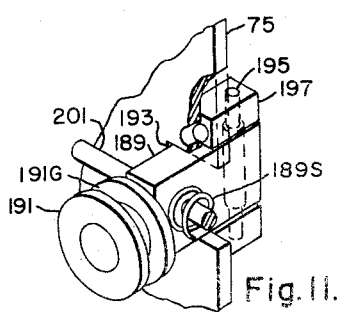
FIG. 11 is an enlarged isometric view of a portion of the carriage unit illustrated in FIG. 4.

As is illustrated in detail in FIG. 11, the roller block 189 extends through a notch 193 in the advance carriage plate 75 and is mounted for rotation about a pin 195, which extends through an aperture in the block and whose ends which are reduced in diameter, pass into respective apertures in a pair of posts 197 and 199. These posts, in turn, are mounted by any suitable means on the rear of the plate 75.

Turning again to FIGS. 4 and 6, a bolt 201 extends through apertures in the advance carriage roller block 79 and the synchronous carriage roller block 189. Compressed between each block and the adjacent end of the bolt 201 are separate respective compression springs 79S and 189S. Consequently, the spring 79S biases the advance carriage roller 80 into its groove or track 81 and thus the advance carriage rollers 76 and 77 into their groove or track 78 so that the rollers firmly grasp the rail 35. Similarly, the spring 189S biases the synchronous carriage rollers 185, 187 and 191 firmly against the synchronous carriage plate 183. This arrangement assures that the advance and synchronous carriages are guided accurately in their desired paths.

The axis of rotation of the left-hand advance carriage roller 80 preferably extends transversely of a line drawn therefrom and parallel to the horizontal centerline of the advance carriage plate 75 to a line extending between the axes of rotation of the right-hand advance carriage rollers 76 and 77 and parallel to the plate 75. Likewise, the axis of rotation of the right-hand synchronous carriage roller 191 extends transversely of a line drawn therefrom and parallel to the horizontal centerline of the plate 75 to a line extending between the axes of rotation of the left-hand synchronous carriage rollers 185 and 187 and parallel to the plate 75. In the illustrated embodiment of the invention, the axes of rotation of the rollers 80 and 191 intersect the horizontal centerline of the advance carriage plate 75 in order to provide balanced forces between the rollers 76 and 77 and the rail 35 and between the rollers 185 and 187 and the synchronous carriage plate 183. By virtue of the construction described, the advance carriage 43A always is located in the same general position relative to the rail 35 even though the rail may be cambered or twisted, and the synchronous carriage 43S always is located in the same general position relative to the advance carriage although the carriage plates may be somewhat warped.

The synchronous carriage plate 183 also has adjustable sockets 203 and 204 for reception respectively of the ends of the chains 56 and 57 (FIG. 6), which are secured thereto. The sockets have adjustable screws, which are in threaded engagement with respective brackets 205 and 206 secured to the synchronous carriage plate, and may be adjusted, as required.

As is clearly shown in FIGS. 4, 6 and 8, the synchronous carriage plate 183 has secured thereto a cam 207 which is designed to operate the various switches, such as the switches 1SU, 2SU, etc., which are secured to the cage plate 141. It will be observed that the switches are operated by engagement of the cam with the cam followers 159 in response to relative movement between the advance and synchronous carriages. As previously pointed out, the position at which each switch is operated may be adjusted by adjusting the position of the desired switch relative to the advance carriage.

An advance stop 209 (FIGS. 6 and 8) is secured to the cage plate 141 and may be adjusted along one of the slots 147 thereof for the purpose of adjusting the magnitude of the lost-motion coupling between the advance and synchronous carriages. This stop is proportioned to engage the lower end of the synchronous carriage cam 207, thus determining the amount of movement in one direction of the advance carriage relative to its associated synchrous carriage.

The soft magnetic armature UMA of the solenoid control unit UM (FIGS. 4, 6, 7 and 8) comprises a plurality of laminations located within the coil UMC when the elevator car is positioned accurately at a floor to provide maximum impedance of the coil. The armature UMA is secured to the synchronous carriage plate 183 by means of a lamination support member 211, which is constructed of a non-magnetic and a non-conductive material such as phenolic resin, and a pair of brackets 213. The armature and coil may be configured to provide any desired pattern of variation of impedance of the coil in response to relative movement of the coil and its armature. For present purposes, it will be assumed that the impedance of the coil varies in a linear manner with such relative motion.

The coil UMC is contained within a tube 214, and the coil and the tube are mounted on the advance carriage plate 75 by means of a pair of end plates 215 and a pair of brackets 217. The end plates 215 are secured to each other for holding the tube 214 and the coil UMC firmly in place by means of a pair of tie rods 219. In order to provide a low-reluctance magnetic path for flux produced by the coil, its tube and end plates are constructed of a soft magnetic material such as steel. For some applications the lower end plate may be of a non-magnetic material such as brass. Each of the end plates has a slot 221 extending from the periphery to the inner opening thereof and the tube 214 has a slot 223 extending lengthwise thereof and aligned with the slots 221 for preventing the establishment of a shorted turn around the coil UMC through its mounting components.

Provision is made for resetting the synchronous carriage 43S each time a stop is made by the elevator car. It will be recalled that for each stop the advance carriage is positioned accurately by the associated floor-stop unit, and the elevator car is positioned accurately under control of the electromagnetic unit EU and the associated inductor plate P (FIG. 1). To facilitate the resetting of the synchronous carriage, the synchronous carriage is provided with a structure having one or more notches. As is shown in FIGS. 4 and 6, this structure may take the form of a plate or centering cam 231 mounted on the synchronous carriage plate 183. The cam 231 has a pair of oppositely disposed cam notches 233 and 235 for receiving a pair of rollers 237 and 239, respectively. These rollers are mounted for rotation about their respective axes at the ends of arms 237A and 239A, and the arms, in turn, are pivotally mounted on the advance carriage plate 75 by means of pins 237P and 239P.

A bolt 241 extends through the arms 237A and 239A. Compressed between each arm and the adjacent end of the bolt 241 are separate respective compression springs 237S and 239S. These springs bias the rollers 237 and 239 into the notches 233 and 235, respectively. Consequently, if the synchronous carriage is free to move relative to the advance carriage and is displaced slightly from the position illustrated in FIG. 4, the rollers will force the synchronous carriage into the correct position. The bias is insufficient to interfere with movement of the advance carriage relative to the synchronous carriage by the advance motor.

It is believed that construction of the carriage unit 45 and each of the floor-stop units FSD will be clear from the foregoing description of the carriage unit 43 and the floor-stop unit 9FSU. The parts associated with the rail 37 in FIGS. 2 and 3 are substantially identical to the parts associated with the rail 35. The advance carriage 45A is guided relative to the rail 37 in substantially the same manner by which the advance carriage 43A is guided by the rail 35. The down pawl relay DPL operates substantially in the same manner as the up pawl relay UPL. When the down pawl relay DPL is energized, it operates the pile-up switches 69 by means of a cam arm 90X which corresponds to the cam arm 90 associated with the up pawl relay UPL. In addition, the down pawl relay positions a movable cam 97X to engage certain pile-up switches 53 associated with one of the floor-stop units. Additional camps 108X, 109X and 111X are secured to the advance carriage 45A to operate pile-up switches 51, 49A and 51A, respectively, in substantially the same manner by which the cams 108, 109 and 111 associated with the advance carriage 43A operate switches. Each part associated with the carriage unit 45 which correspond to a related part associated with the carriage unit 43 is identified by the same reference character followed by the suffix "X."

When the down pawl relay DP1 is energized, it positions a stop pawl 99X to engage a lug 100X of a floor-stop unit during upward travel of the carriage unit 45. This corresponds to the operation of the stop pawl 99 and the lug 100. It will be understood that a clamp 112X for each of the floor-stop units FSD is associated with the rail 37, and the sets of pile-up switches 53, 55, 53A and 55A are secured to the clamps 112X in substantially the same manner discussed for the floor-stop unit 9FSU. Furthermore, each of the clamps 112X has a cam 119X which operates a set of pile-up switches 115X mounted on the advance carriage 45A. These components respectively correspond to the cam 119 carried by the clamp 112 of the floor-stop unit 9FSU and the set of pile-up switches 115 secured to the advance carriage 43A.

Switches, such as a switch 1SD, correspond to the switches, such as the switch 1SU, of the up carriage unit, and are secured to a cage plate 141X in the same manner. These switches are operated by a cam 207X in the same manner by which the switches of the up carriage unit 43 are operated by the corresponding cam 207. The synchronous carriage 45S is guided by the advance carriage 45A in a manner which will be clear from the discussion of the corresponding parts of the carriage unit 43.

Although the positions and lengths of the various cams may be selected in accordance with the requirements of each elevator system, it may be helpful to consider a specific example. Dimensions or displacements will be given in terms of feet of car travel corresponding to the displacements of the advance carriages from the positions they occupy when the elevator car is stopped at a floor. Thus, the cams 97 and 97X (when in camming position) may operate the switches 49 and 53 two feet before the floor and release the switches one foot after the floor. The cams 108 and 108X may operate the switches 51 and 55 two feet before the floor and may release the switches four feet after the floor. The cam 109 may operate the switches 49A four feet before the floor and may release the switches four feet after the floor. The cam 109X may operate the switches 53A six feet before the floor and release the switches six feet after the floor. The cams 111 and 111X may operate the switches 51A and 55A four feet before the floor and may release the switches two feet after the floor. Finally, the floor-stop unit cams 119 and 119X may operate the advance carriage switches 115 and 115X one foot before the floor and may release the switches one foot after the floor.

ELEVATOR CONTROL SYSTEM

As previously pointed out, the invention may be employed with various types of elevator control systems. In order to illustrate the application of the invention to a suitable elevator control system, reference will be made to the circuits shown in FIGS. 12 and 13, which, as has been noted, are based respectively on FIGS. 4A and 4 of the Oplinger Patent 2,874,806. In these circuits a number of electromagnetic relays and switches are illustrated. These relays and switches may have contacts of the make type, which are closed when the relay or switch is energized or picked up and which are opened when the relay is deenergized or dropped out. Alternatively, the relays or switches may have break contacts, which open when the relay or switch is energized or picked up and which are closed when the relay or switch is deenergized or dropped out. Each of the relays and switches will be designated by a suitable reference character, and each set of contacts will be designated by an appropriate suffix in the form of a numeral. For example, the expression U1 designates the first set of contacts for the up switch U, whereas the expression U3 designates the third set of contacts for the up switch U.

Figure 12:
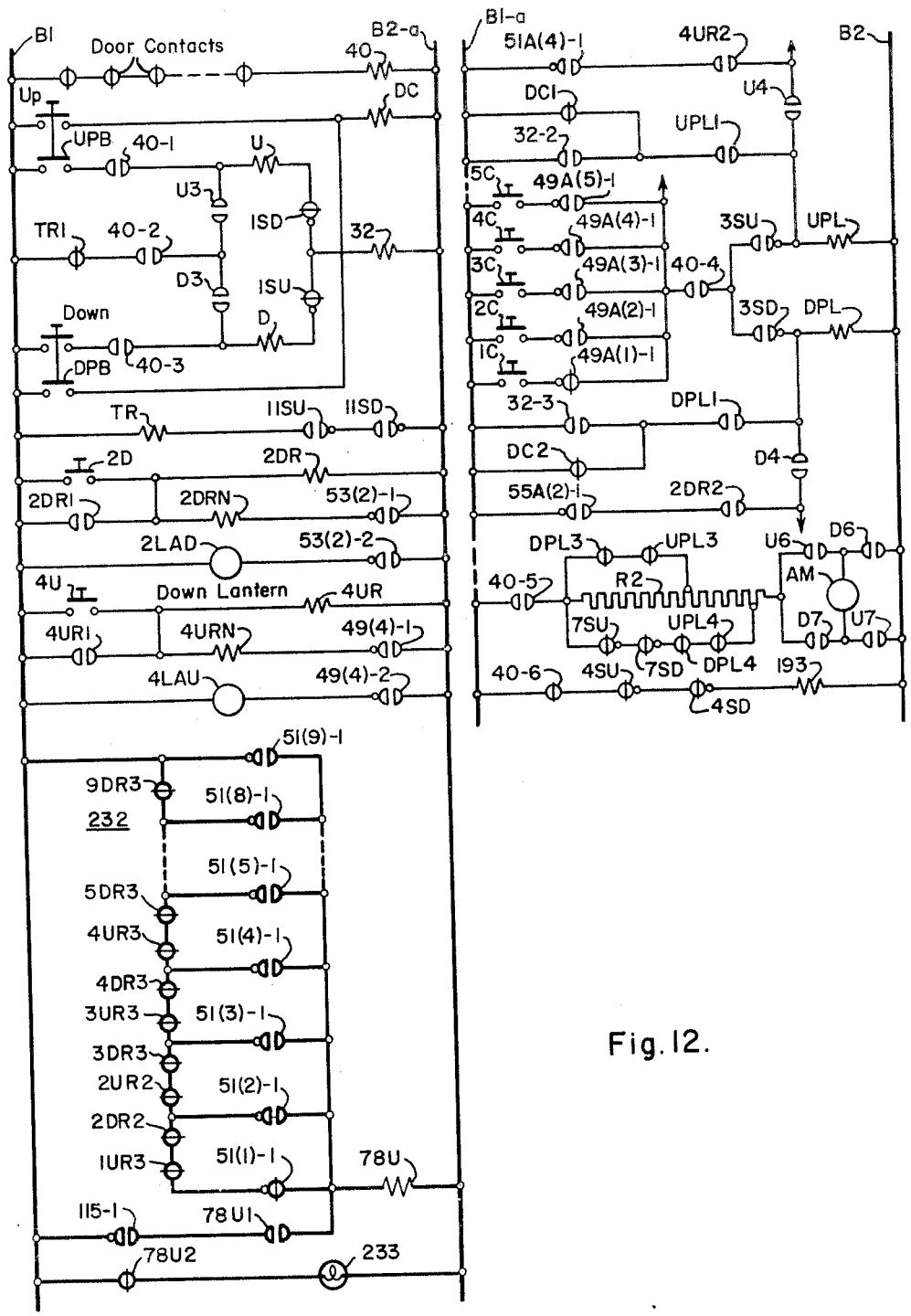
FIGS. 12 and 13 are schematic views with circuits illustrated in straight line form showing control circuits suitable for the elevator system of FIG. 1.

In order to facilitate consideration of the control system, the following components of FIG. 12, the circuits of which are shown in deenergized condition, are illustrated which are identical with and/or serve functions identical to components bearing the same reference characters in the aforesaid Oplinger patent:

| | |
|---|---|
| B1, B2, B1-a, B2-a | Direct-current buses. |
| 40 | Door relay. |
| UPB | Up push button. |
| DPB | Down push button. |
| DC | Door closing relay. |
| U | Up switch. |
| D | Down switch. |
| 32 | Car running relay. |
| 2D, etc. | Down floor call push button. |
| 2DR, etc. | Down floor call registering relays. |
| 2DRN, etc. | Down floor call canceling coils. |
| 2LAD, etc. | Down lanterns. |
| 1U, etc. | Up floor call push buttons. |
| 1UR, etc. | Up floor call registering relays. |
| 1URN, etc. | Up floor call canceling coils. |
| 1LAU, etc. | Up lanterns. |
| 1C, etc. | Car call push buttons. |
| UPL | Up pawl relay. |
| DPL | Down pawl relay. |
| AM | Advance motor. |
| R2 | Advance motor speed control resistor. |
| 193 | Sprocket wheel release coil. |
| 1SU, 1SD, 3SU, 3SD 4SU, 4SD, 7SU, 7SD, 11SU, 11SD | Cage switches. |
| 49, 49A, 51A, 53, 55A | Pile-up switches of floor-stop units. |

For a complete understanding of the above-listed components, reference may be made to the aforesaid Oplinger patent. In addition to these components, the present FIG. 12 includes the following new components:

| | |
|---|---|
| 51 | Pile-up switches of floor-stop units. |
| 78U | Floor call above relay. |
| 115 | Pile-up switch of advance carriage 43A. |
| 233 | Lamp. |

In order to ascertain whether a floor call exists for a floor above the position of the elevator car, a floor call above circuit 232 is provided. This circuit includes in series break contacts for all of the up and down floor call registering relays arranged in the order of the floors. To conserve space, floor call above circuit contacts for the sixth, seventh and eighth floors are omitted in FIG. 12.

The floor call above circuit 232 includes pile-up switches of the floor-stop units associated with the floor selector carriage unit 43. Thus, the switch 51(1)-1 is in the floor-stop unit for the first floor, and the switch 51(2)-1 is in the floor-stop unit for the second floor, etc. Each of the pile-up switches 51(1)-1 through 51(9)-1 is connected to the floor call above circuit 232 in such a way that all floor call registering relays requiring travel of the elevator car above the floor represented by a pile-up switch are located above such switch. For example, the contacts 4UR3 and 5DR3 are contacts of floor call registering relays which require travel of the elevator car above the fourth floor, but not above the fifth floor. Consequently, these contacts are located in the floor call above circuit 232 between the pile-up switches 51(4)-1 and 51(5)-1. The pile-up switches 51(6)-1, 51(7)-1 and 51(8)-1 are not illustrated in FIG. 12, but it will be understood that they are associated with the circuit 232 in a similar manner. (The pile-up switch 51(9)-1 is connected directly to the bus B1, since it is assumed that the ninth floor is the highest floor served by the elevator car.)

As has been pointed out in the preceding discussion of the present floor selector, in terms of feet of car travel corresponding to the displacement of the advance carriage 43A from the position it occupies when the elevator car is stopped at a floor, each of the switches 51(1)–1 through 51(9)–1 is closed by the cam 108 two feet before the corresponding floor and is opened by such cam four feet after such floor. Consequently, as long as no floor call is registered requiring travel of the elevator car above its position, no set of break contacts in the floor call above circuit 232 is open which may effect deenergization of the floor call above relay 78U.

It also will be recalled that in terms of feet of car travel corresponding to the displacement of the advance carriage 43A from the position it occupies when the elevator car is stopped at a floor, its pile-up switch 115–1 is opened by each of the floor-stop unit cams 119 one foot before the corresponding floor and is closed by such cam one foot after such floor. If the pile-up switch 115–1 is closed when the floor call above relay 78U is picked up, closure of make contacts 78U1 establishes a self-holding circuit for the relay. Energization of the relay 78U also is accompanied by opening of its break contacts 78U2 to deenergize the lamp 233, thus indicating that no floor call is registered for a floor above the position of the elevator car. Conversely, dropout of the relay 78U results in opening of make contacts 78U1 to interrupt the self-holding circuit for the relay and in closure of break contacts 78U2 to energize the lamp 233, thus indicating the registration of a floor call for a floor above the position of the elevator car. Conveniently, the lamp 233 may be located within the elevator car for observation by the car attendant.

Figure 13:
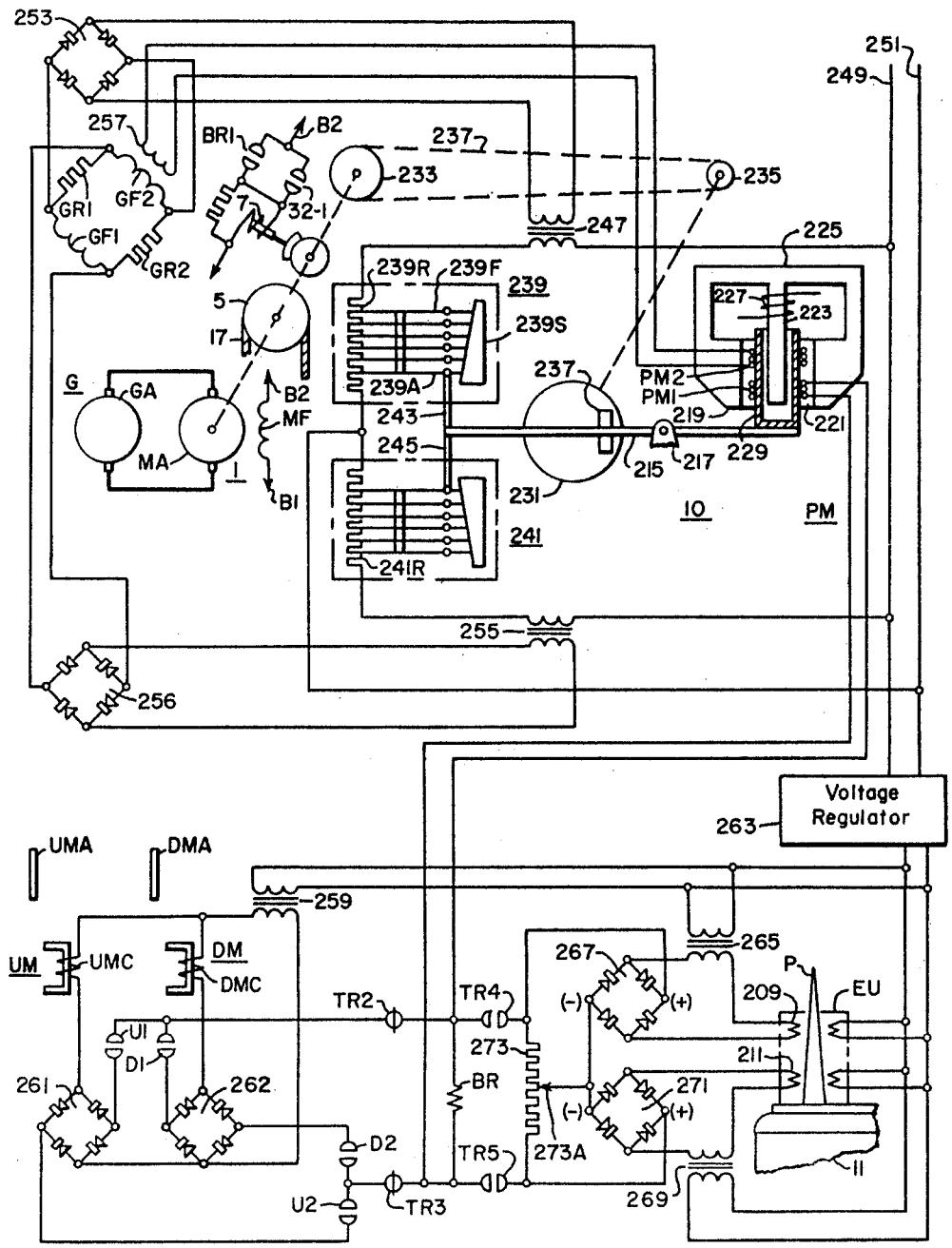

As has been indicated, the present FIG. 13 is based on FIG. 4A of the aforesaid Oplinger patent. Consequently, reference may be made thereto for a complete understanding of the components of FIG. 13. To facilitate consideration of FIG. 13, the following components thereof are listed which are identical with components bearing the same reference characters in the aforesaid Oplinger patent:

| | |
|---|---|
| 1 | Elevator car motor. |
| MA | Motor armature. |
| MF | Motor field. |
| G | Generator. |
| GA | Generator armature. |
| GF1, GF2 | Generator field windings. |
| GR1, GR2 | Generator field resistors. |
| 10 | Control unit. |
| PM | Pattern motor. |
| PM1, PM2, 227 | Pattern motor windings. |
| 215 | Pattern motor lever. |
| 231 | Electroconductive disc. |
| 237 | Permanent magnet. |
| 239, 241 | Rheostats. |
| 247, 255 | Generator field transformers. |
| 257 | Generator anti-hunt winding. |
| UM | Up solenoid control unit. |
| DM | Down solenoid control unit. |
| 259 | Solenoid control unit transformer. |
| 263 | Voltage regulator. |
| BR | Auxiliary break relay. |
| EU | Electromagnetic unit. |
| P | Magnetic plate. |

Figure 14:
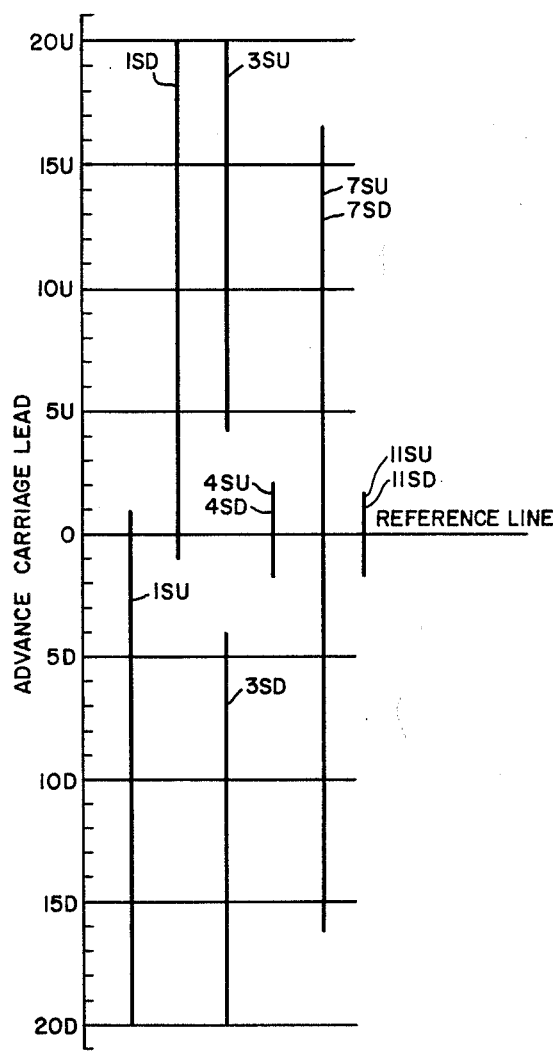
FIG. 14 is a diagrammatic view showing conditions of electrical switches in the system of FIG. 1.

It will be recalled that a number of switches are operated in accordance with relative movement between the floor selector advance and synchronous carriages. Suitable conditions of operation of these switches for the specific system under consideration are illustrated in FIG. 14. However, it should be understood that the lead of the advance carriages relative to the synchronous carriages and the operations of the various switches may be selected in accordance with the requirements of each elevator system. In FIG. 14, the reference line corresponds to a position of the advance carriages in registration with the synchronous carriages. Such registration occurs when the elevator car is stopped at a floor. Ordinates above and below the reference line indicate the lead of the advance carriages relative to the synchronous carriages respectively for up travel and down travel, as the elevator car nears the floor at which it is to stop. By inspection of FIG. 4, it will be noted that the maximum lead in either direction is of the order of twenty feet (expressed in terms of the corresponding feet of car travel). As was discussed heretofore (FIGS. 6 and 8), such lead for the advance carriage 43A may be determined by adjustment of the advance carriage stop 209 along its associated slot 147 of the cage plate 141, and similarly for the advance carriage 45A. Returning to FIG. 14, lines are illustrated therein to indicate the period during which switches have their contacts closed. For example, the switch 1SU is positioned to have its contacts closed from a position wherein the elevator car is approximately one foot above each floor to a position wherein the carriage 43A has its full lead or advance for travel in a downward direction. These contacts are open when the advance carriage is moved in the up direction by more than a foot (expressed in terms of a corresponding foot of car travel) from the position which it occupies when the elevator car is stopped at a floor. As a further example, the switches 11SU and 11SD are closed when the elevator car is within approximately twenty inches of a floor at which it is to stop for either direction of travel. These switches are open when the advance carriages are moved in either direction by more than twenty inches (expressed in terms of corresponding inches of car travel) from the position they occupy when the elevator car is stopped at a floor. It is believed that the operating conditions for the remaining switches can be ascertained by reference to FIG. 14.

OPERATION

A. *Car Moves From First Floor to Fourth Floor*

It is believed that an understanding of the invention will be facilitated by a discussion of certain typical operating sequences for the elevator system. For the first sequence, it will be assumed that the elevator car 11 (FIG. 1) is parked at the lower terminal or first floor in a position of registry therewith, that the car gate 21 and the hoistway door 19 are open and that a passenger desiring to proceed to the fourth floor enters the elevator car. It further will be assumed that the direct-current buses B1, B2, B1–a and B2–a (FIGS. 12 and 13) are energized.

While the elevator car is parked at the lower terminal floor with its doors open, the transfer relay TR (FIG. 12) is energized. Also, the coil 193 is energized. As is explained in the aforesaid Oplinger and Savage patents, this coil, when energized, effects the resetting of the synchronous carriages 43S and 45S relative to the advance carriages 43A and 45A (FIGS. 2 and 3). In addition, the down pawl relay DPL (FIG. 12) is energized through its holding contacts DPL1 and break contacts DC2. Finally, the floor call above relay 78U is energized and picked up through the pile-up switch contacts 51(1)–1 and the serially connected break contacts of all of the floor call registering relays in the control system. Closure of make contacts 78U1 has no immediate effects on operation, inasmuch as the pile-up switch contacts 115–1 in series therewith are open. Opening of break contacts 78U2 effect deenergization of the lamp 233, thus indicating to the elevator car attendant that no floor call is registered in the system. All other electromagnetic relays and switches in FIGS. 12 and 13 are deenergized at this time.

When the passenger enters the elevator car, the attendant operates the car call push button 4C to register a car call for the fourth floor. As is explained in the aforesaid Oplinger patent, the car call push buttons are of the type which when actuated by the car attendant remain actuated until the elevator car reverses its direction of travel; and although the resetting of these push buttons may be performed automatically, it is assumed that they are reset manually by the car attendant after the completion of each trip in one direction.

Next, the elevator car attendant operates the up push button UPB to energize the door closing relay DC. This relay, when energized, initiates closure of the hoist-way door for the lower terminal floor and the car gate in a conventional manner. As a result of such closures, the door relay 40 is energized. This relay closes its make contacts 40–2, 40–3, 40–4 and 40–5 to prepare certain circuits for subsequent energization. In addition, break contacts 40–6 open to deenergize the coil 193. As a result of such deenergization, the sprocket wheel 33 (FIGS. 2 and 3) is coupled to the synchronous motor SM, and free movement of the synchronous carriages 43S and 45S is prevented.

When the door closing relay DC was energized, it opened its break contacts DC1 and DC2. Opening of the contacts DC1 has no immediate effect on operation. Opening of the contacts DC2 results in deenergization of the down pawl relay DPL. The operation of the up push button UPB also results in completion of the following circuit following closure of make contacts 40–1:

B1, UPB, 40–1, U, 1SD, 32, B2–a

The switch 1SD is positioned to have its contacts closed from a position wherein the elevator car is approximately one foot below a stop to a position wherein the selector advance carriages are fully advanced for car travel in an upward direction.

Energization of the up switch U results in closure of its make contacts U1 and U2 (FIG. 13) to connect the coil PM1 of the pattern motor PM to the rectifier 261 for energization in the proper direciton for up travel of the elevator car when the contacts TR2 and TR3 close. Make contacts U3 (FIG. 12) close to prepare a holding circuit for the switch U and the car running relay 32 for subsequent completion. Make contacts U4 close to prepare the up pawl relay UPL for energization as the elevator car approaches a floor for which an up floor call is registered. Finally, make contacts U6 and U7 close to complete an energizing circuit for the advance motor AM. The direction of energization of the advance motor, as determined by the contacts U6 and U7, is correct for up travel of the elevator car.

At this stage, a substantial part of the resistor R2 is shunted, and the armature of the advance motor is energized through the circuit:

B1–a, 40–5, 7SU, 7SD, DPL4, UPL4, U6, AM, U7, B2

By reference to FIGS. 2 and 3, it will be recalled that the advance motor AM rapidly moves the advance carriage 43A in an upward direction through the distance permitted by the lost-motion coupling between the advance and synchronous carriages. The relative motion of the advanced and synchronous carriages results in movement of the armature UMA away from the up solenoid control unit coil UM.

As the advance carriages are moved by the advance motor relative to the synchronous carriages, the switch 1SU opens. By reference to FIG. 12, it will be noted that such opening prevents energization of the down switch D. Movement of the advance carriage 43A also results in disengagement of the cam follower 117 (FIGS. 7 and 10) of the pile-up switch 115 from the cam 119 of the floor-stop unit 1FSU. Consequently, the contacts 115–1 (FIG. 12) close to complete the holding circuit of the floor call above relay 78U. Further movement of the advance carriage effects opening of the switch 4SU to prevent energization of the coil 193. Next, the cam follower of the pile-up switch 51 associated with the floor-stop unit for the first floor (refer to FIGS. 7 and 9) disengages the advance carriage cam 108, and the contacts 51(1)–1 (FIG. 12) thus open. However, energization of the relay 78U is maintained through its holding circuit.

As the advance carriage continues to move, the switch 3SU closes to permit energization of the up pawl relay UPL by a registered car call. However, for reasons which will be set forth below, such energization cannot take place until the advance carriage nears a position corresponding to a floor for which a car call is registered.

Continued movement of the advance carriage 43A results in movement of the armature UMA (FIGS. 2 and 3) out of the associated solenoid coil UMC to provide minimum impedance of the coil. For present purposes, it will be assumed that the characteristics of the control system are such that suitable acceleration of the elevator car is obtained if the solenoid coil UMC has minimum impedance.

During movement of the advance carriages, the switch 11SU opens to deenergize the transfer relay TR. This occurs when the movement of the advance carriages is equivalent to twenty inches of car travel. In addition, this switch 7SU opens as the advance carriages near their fully advanced positions to introduce a substantial portion of the resistor R2 in circuit with the armature of the advance motor AM. This reduces heating of the advance motor, but sufficient torque is produced by the advance motor under these conditions to force the advance carriages to follow the synchronous carriage movements.

Upon dropout, the transfer relay TR closed its break contacts TR2 and TR3 (FIG. 13), and opened its make contacts TR4 and TR5 to place the coil PM1 and the relay BR through the contacts U1 and U2 under control of the up solenoid control unit UM. Additionally, break contacts TR1 (FIG. 12) closed to complete a holding circuit for the car running relay 32 and the up switch U which may be traced as follows:

B1, TR1, 40–2, U3, U, 1SD, 32, B2–a

Consequently, the car attendant now may release his up push button UPB. Such release deenergizes the door closing relay DC, which closes its break contacts DC1 and DC2. The closure of these contacts has no immediate effect on system operation.

It will be assumed that the advance carriage 43A now is fully advanced and that the stop 209 (FIGS. 6 and 8) is in engagement with the cam 207 of the synchronous carriage 43S. From this point on, the advance carriages can advance only with the associated synchronous carriages.

If desired, the elevator system may be designed so that the elevator car starts to move before the advance carriages reach their fully advanced positions. However, in a preferred embodiment of the invention, the advance carriages are moved rapidly and reach their fully advanced positions before the elevator car starts to move.

It will be recalled that the car running relay 32 was energized at the time the up switch U was energized. As a result of its energization, the car running relay closed its make contacts 32–1 (FIG. 13) to release the elevator car brake. Such release permits upward travel of the elevator car. The car running relay when energized also closed its make contacts 32–2 and 32–3 (FIG. 12) to prepare holding circuits for the pawl relays UPL and DPL for subsequent operation.

Inasmuch as break contacts TR2 and TR3 (FIG. 13) and make contacts U1 and U2 are closed, the winding PM1 of the pattern motor PM and the auxiliary brake relay BR are connected across the secondary winding of the transformer 259 through the rectifier 261 and the coil UMC of the up solenoid control unit UM. Since the coil UMC now has minimum impedance, maximum energization is applied to the winding PM1 of the pattern motor, and the resultant torque applied to the lever 215 decreases materially the effective resistance of the rheostat 241. The decreased resistance of the rheostat 241 results in the flow of substantial current through the primary winding of the transformer 255, and the generator G consequently is excited for full speed operation in the up direction. The energization of the generator field windings GF1 and GF2 is accompanied by the inducing of voltage in the winding 257 to energize the winding PM2 of the pattern motor PM. The develops a force acting in opposition to the force produced by energization of the winding PM1. However, the energization of the winding PM2 exists only while the energization of the field windings is changing. The purpose of the winding PM2 is to decrease hunting of the motor 1.

The motor 1 now accelerates to move the elevator car in the up direction. Such acceleration is accompanied by acceleration of the disk 231, which is coupled electromagnetically to the lever 215 through the magnet 237. As the speed of the motor increases, the torque applied to the lever 215 by the disk 231 increases until a condition of equilibrium is reached, at which time the speed of the motor corresponds to the desired running speed of the elevator car. Any deviation of the elevator car from the desired speed results in a change in the torque applied to the lever 215 by the disk 241. This change is in the proper direction to restore the motor 1 to the desired speed.

As the elevator car moves, car motion is transmitted through the transmitter or generator SG (FIG. 1) to the motor SM. This motor thereupon drives the synchronous carriages 43S and 45S (FIGS. 2 and 3) in accordance with car movement. Since the advance carriages 43A and 45A now are biased by the advance motor AM in the direction of travel of the synchronous carriages, it follows that all of the carriages move as a unit.

As the elevator car approaches each floor, the floor-stop unit pile-up switch 51 associated with such floor is operated to close its contacts in the circuit of the floor call above relay 78U, and, within one foot of the floor, the advance carriage pile-up switch 115-1 in the holding circuit of the relay is opened as explained heretofore. Consequently, if a floor call is registered for a floor above, the floor call above relay 78U drops out to close its break contacts 78U2, thus energizing the lamp 233. However, it is assumed that no floor call is registered in the system at the present time, and thus the relay 78U remains picked up.

It will be assumed that one of the switches in each of the sets 49A (FIGS. 2, 7 and 9) is employed for picking up a car call for the associated floor in either direction of travel of the elevator car. Thus, in FIG. 12, the switch 49A(1)–1 is in the floor-stop unit for the first floor, the switch 49A(2)–1 is in the floor-stop unit for the second floor, etc. However, the closure of one of these switches is effective for a control operation only if the associated car call push button is in operated condition.

As the elevator car approaches the fourth floor and advance carriage 43A nears its fourth-floor position, the switch 49A(4)–1 for the fourth floor is closed. This closure may take place when the advance carriage is short of the position which it occupies when the elevator car is at the fourth floor by a distance of the order of four feet measured in terms of car travel. Since it is assumed that the advance carriage leads the elevator car by a distance equivalent to twenty feet of car travel, it follows that the switch 49A(4)–1 is closed when the elevator car is approximately twenty-four feet from the fourth floor. Upon closure of the switch 49A(4)–1, the following circuit is completed:

B1–a, 4C, 49A(4)–1, 40–4, 3SU, UPL, B2

Upon energization, the up pawl relay UPL moves the cam arm 90 (FIGS. 4 and 6) to operate its contacts represented by the set of pile-up switches 67. Each one of the switches will be identified by the reference character UPL followed by an appropriate suffix. As is shown in FIG. 12, closure of make contacts UPL1 completes a holding circuit for the up pawl relay through make contacts 32–2. Opening of break contacts UPL3 and UPL4 introduces substantial resistance in series with the advance motor AM shortly before the advance carriages are brought to a stop. This reduces heating of the advance motor as the elevator car is brought to a stop.

The energization of the up pawl relay UPL also projects the cam 97 (FIGS. 7 and 9) into position for operating the set of pile-up switches 49 for the fourth floor. The expression "49(4)" designates the set for the fourth floor. One of these switches 49(4)–1 (FIG. 12) is closed by the cam to energize the canceling coil 4URN for the fourth floor in the event that an up floor call is registered for the fourth floor. However, under the assumed conditions, no floor call has been registered. The cam also closes contacts 49(4)–2 for the purpose of energizing the up lantern 4LAU for the fourth floor.

In addition, energization of the up pawl relay UPL results in projection of the stop pawl 99 (FIGS. 7 and 10) into position to engage the lug 100 associated with the clamp 112 of the floor-stop unit associated with the fourth floor. Consequently, as the advance carriage 43A continues its upward travel, the pawl 99 engages the lug 100 for the floor-stop unit of the fourth floor to bring the advance carriages to a stop.

As the elevator car continues in the upward direction, the synchronous carriage 43S (FIGS. 4, 6 and 7) moves with respect to the advance carriage 43A to operate the switch 1SU and similar switches mounted on the advance carriage. As previously explained, these switches are operated in accordance with the development illustrated in FIG. 14.

Movement of the synchronous carriage 43S (FIGS. 2 and 3) relative to the advance carriage 43A also results in movement of the armature UMA toward the coil UMC of the up solenoid control unit UM. The movement of the armature is accompanied by a gradual increase in the impedance of the coil UMC and consequently by a gradual decrease in the energization of the winding PM1 (FIG. 13) of the pattern motor PM. The resultant reduction in the torque applied to the lever 215 by the pattern motor results in movement of the lever in a clockwise direction about its pivot 217 to increase the effective resistance of the rheostat 241. This decreases the current supplied to the primary winding of the transformer 255 and thereby the excitation of the generator G. Since the excitation changes, a voltage is induced in the winding 257 which is in a proper direction for minimizing hunting of the motor 1.

When the elevator car reaches a distance of the order of twenty inches from the fourth floor, the switches 11SU and 11SD (FIG. 12) close to complete an energizing circuit for the transfer relay TR. This relay opens its break contacts TR1 to interrupt the holding circuit for the up switch U and the car running relay 32. The transfer relay also opens its break contacts TR2 and TR3 (FIG. 13) to disconnect the coil of the up solenoid control unit UM from the winding PM1 and the auxiliary brake relay BR. Make contacts TR4 and TR5 close to connect the winding PM1 and the relay BR for energization under control of the electromagnetic unit EU.

Deenergization of the up switch U is accompanied by opening of its make contacts U1 and U2 (FIG. 13) and U3 and U4 (FIG. 12) without immediate effect on the operation of the system. Opening of make contacts U6 and U7 deenergizes the advance motor AM. Drop-out of the car running relay 32 is accompanied by the opening of its make contacts 32–1 (FIG. 13). However, make contacts BR1 of the auxiliary brake relay BR close before the brake can drop out. Opening of make contacts 32–2 and 32–3 (FIG. 12) has no immediate effect on the operation of the system.

At the time the transfer is made, the electromagnetic unit EU (FIG. 1) is adjacent the lower end of the plate P for the fourth floor which has a substantial shielding effect. Consequently, a larger current is provided by the rectifier 271 (FIG. 13) than by the rectifier 267, and the winding PM1 of the pattern motor PM is energized with proper polarity to continue the upward motion of the elevator car at a low rate of speed.

As the elevator car continues its upward motion, the current applied by the rectifier 271 decreases and the current supplied by the rectifier 267 increases to decrease the difference therebetween. This gradually reduces the energization of the winding PM1 and consequently reduces the speed of the elevator car. When the car reaches a position of registry with the fourth floor, the voltage applied to the winding PM1 is reduced to zero, and the elevator car speed is zero. Consequently, the car is at rest accurately at the desired floor. At this stage, the voltage applied to the auxiliary brake relay BR also reduces to zero, and this relay opens it make contacts BR1 to permit application of the brake 7. Should the elevator car be displaced from the fourth floor thereafter for any reason such as cable contraction or stretch, the car will be returned into registry with the floor by a sequence which will be understood from the aforesaid Oplinger patent 2,874,806.

After the elevator car arrives at the fourth floor, the car attendant opens his car gate and the hoistway door for the fourth floor in order to discharge his passenger. As a result of such openings, the door relay 40 (FIG. 12) is deenergized. This relay opens its make contacts 40–1, 40–2, 40–3, 40–4 and 40–5, but such openings have no present effect on the operation of the system. The relay also closes its break contacts 40–6 to complete an energizing circuit for the coil 193.

It will be recalled that energization of the coil 193 uncouples the sprocket wheel 33 (FIGS. 2 and 3) from the motor SM. Since the sprocket wheel no longer prevents free movement of the synchronous carriages, the rollers 237 and 239 (FIGS. 4 and 6) can effect movement of the synchronous carriages into exact registration with the advance carriages in the event that resetting is necessary.

It also will be recalled that when the elevator car is stopped at the fourth floor, the advance carriage cam 108 (FIGS. 7 and 9) is in engagement with the cam follower of the set of pile-up switches 51 associated with the floor-stop unit for the fourth floor. In addition, the floor-stop unit cam 119 (FIGS. 7 and 10) is in engagement with the cam follower 117 of the set of advance carriage pile-up switches 115. Consequently, the contacts 51(4)–1 (FIG. 12) in the energizing circuit of the floor call above relay 78U are closed, and the relay is energized and picked up. Thus, break contacts 78U2 are open to effect continued deenergization of the lamp 233, indicating to the elevator car attendant that no floor call is registered for a floor above the fourth floor. In addition, the contacts 115–1 in the holding circuit of the relay 78U are open. Should break contacts 5DR3, for example, open as the result of the registration of a down floor call for the fifth floor, the relay 78U would drop out to close the contacts 78U2, and the lamp 233, therefore, would be energized to indicate the registration of a floor call for a floor above the fourth floor.

B. Car Moves From Fourth Floor to Second Floor

Next, it will be assumed that the elevator car is positioned at the fourth floor during a down trip. The down pawl relay DPL is assumed to have been energized to bring the car to a stop at the fourth floor, and the down lantern for the fourth floor is illuminated. At this time, a prospective passenger on the second floor operates the push button 2D for the second floor in order to register a down floor call. By reference to FIG. 12, it will be noted that operation of the push button 2D energizes the down floor call registering relay 2DR. This relay closes its contacts 2DR1 to establish a holding circuit for itself. In addition, the relay closes its make contacts 2DR2 to prepare for subsequent energization therethrough of the down pawl relay DPL. Opening of break contacts 2DR3 has no immediate effect on operation, since these contacts are below the closed pile-up switch contacts 51(4)–1 in the energizing circuit of the floor call above relay 78U.

The car attendant now operates the down push button DPB to energize the door closing relay DC. This initiates closure of the hoistway door for the fourth floor and the car gate. The door closing relay also opens its break contacts DC1 and DC2. In opening, the contacts DC2 deenergize the down pawl relay DPL, and this relay thereupon opens contacts 53(4)–2 (corresponding to contacts 53(2)–2 for the second floor) to interrupt the illumination of the down lantern for the fourth floor. The opening of the contacts 53(4)–1 (corresponding to contacts 53(2)–1 for the second floor) has no immediate effect. The down pawl relay DPL also opens its contacts DPL1, but this has no immediate effect on the system. Break contacts DPL3 and DPL4 close to permit shunting of substantial parts of the resistor R2.

Closure of the car gate and the hoistway door energizes the door relay 40. This relay closes its make contacts 40–1, 40–2, 40–4 and 40–5, but such closures have no immediate effect on the operation of the system. In addition, the door relay opens its break contacts 40–6 to deenergize the coil 193 in order to permit the motor SM (FIGS. 2 and 3) to drive the synchronous carriages 43S and 45S.

The operation of the down push button DPB (FIG. 12) by the elevator car attendant also completes the following circuit after closure of make contacts 40–3:

B1, DPB, 40–3, D, 1SU, 32, B2–a

The resulting energization of the down switch D closes make contacts D1 and D2 (FIG. 13) to prepare the coil PM1 of the pattern motor PM for energization in the proper direction for down travel of the elevator car. Closure of make contacts D3 and D4 (FIG. 12) has no immediate effect on system operation. Closure of make contacts D6 and D7 completes an energizing circuit for the advance motor AM, the direction of energization being correct for down travel of the elevator car. Since the resistor R2 is shunted, the advance motor rapidly advances the associated advance carriages.

As the advance carriages are moved relative to their associated synchronous carriages, the switch 1SD opens to prevent energization of the up switch U. The switch 3SD closes to permit energization of the down pawl relay DPL when the elevator car is to answer a registered car call. The switch 4SD opens to prevent energization of the coil 193 during down travel of the elevator car. The switch 7SD opens to introduce resistance in series with the armature of the advance motor shortly before the advance carriages reach their maximum advance for the down direction. Finally, the switch 11SD opens to denergize the transfer relay TR, and this relay closes its break contacts TR1, TR2 and TR3 (FIG. 13) and opens its make contacts TR4 and TR5.

The car running relay 32 upon being energized closes its make contacts 32–1 to permit release of the elevator brake. Closure of make contacts 32–2 (FIG. 12) has no effect on operation, while make contacts 32–3 close to prepare a holding circuit for the down pawl relay DPL for subsequent operation.

It will be recalled that the advance carriages reach their maximum advances prior to movement of the elevator car. The advance of the carriage 45A (FIGS. 2 and 3) is accompanied by movement of the armature DMA away from the coil DMC of the down solenoid control unit DM to reduce the impedance of the coil. Consequently, a substantial current is supplied to the winding PM1 (FIG. 13) of the pattern motor PM from the secondary winding of the transformer 259 through the low impedance of the coil DMC, the rectifier 262, make contacts D1 and D2 and break contacts TR2 and TR3. The auxiliary brake relay BR also is energized and picked up. The current to the pattern motor has the proper polarity to produce downward motion of the elevator car. Thus, the pattern motor applies a torque to the lever 215 acting in a clockwise direction about the pivot 217. The resulting movement of the lever 215 operates the springs 239A through 239F to reduce the effective resistance of the rheostat 239. This permits substantial current to flow through the primary winding of the transformer 247, and the transformer supplies through the rectifier 253 direct current to the field windings GF1 and GF2 of the generator G with proper polarity for down movement of the elevator car.

As the motor 1 accelerates, it rotates the disc 231 to apply through the magnet 237 a torque to the lever 215 which acts in opposition to the torque applied by the winding PM1. An equilibrium finally is reached when the elevator car operates at the desired speed. As previously noted, the winding 257 operates to minimize hunting of the system.

As the elevator car moves in the down direction, the generator or transmitter SG (FIG. 1) energizes the motor SM to drive the synchronous carriages 43S and 45S (FIGS. 2 and 3) in synchronism with movement of the elevator car. Since the advance carriages 43A and 45A are maintained in their advance positions, they move in unison with the synchronous carriages during full speed travel of the car in the down direction.

Registered down floor calls are picked up by one of the pile-up switches in each of the floor-stop unit sets 55A (FIG. 2). As the advance carriage 45A approaches each of the associated floor-stop units in succession, it operates successively the sets of switches 55A. When the advance carriage reaches a predetermined point, such as a position which may be four feet (measured in terms of car travel) before the second floor, it closes the switch 55A(2)–1 (FIG. 12). This is one of the switches of the set 55A associated with the floor-stop unit for the second floor. Since the advance carriage leads the elevator car by a distance of twenty feet (measured in terms of car travel), it follows that the switch 55A(2)–1 is closed when the elevator car is about twenty-four feet from the second floor.

Upon closure of the switch 55A(2)–1, the down pawl relay DPL is energized through the following circuits:

B1–a, 55A(2)–1, 2DR2, D4, DPL, B2

The down pawl relay closes its make contacts DPL1 to establish through the now closed make contacts 32–3 a self-holding circuit. In addition, break contacts DPL3 and DPL4 open to insert additional resistance in series with the advance motor AM shortly before the advance carriages are brought to a stop.

It will be recalled that the down pawl relay DPL upon energization projects its cam 97X into position to engage the set of pile-up switches 53 for the second floor (see the corresponding components 97 and 49, FIGS. 7 and 9). By reference to FIG. 12, it will be observed that the set of switches 53 for the second floor includes a switch 53(2)–1, which is closed to energize the canceling coil 2DRN. Such energization cancels the down floor call registered for the second floor. In addition, a second switch of the set, 53(2)–2, closes to energize the down floor lantern 2LAD for the second floor. Deenergization and drop-out of the down floor call registering relay 2DR has no immediate effect on the operation of the system.

The energization of the down pawl relay DPL also resulted in the projection of the pawl 99X into position to engage the lug 100X associated with the clamp 112X for the floor-stop unit associated with the second floor (see the corresponding components 99, 100, and 112, FIGS. 7 and 10). Consequently, the pawl 99X engages the associated lug 100X to bring the advance carriages to a stop when the elevator car is approximately twenty feet from the second floor. Continued movement of the elevator car results in movement of the synchronous carriages relative to the advance carriages. It will be recalled that such relative motion operates a plurality of cage switches mounted on the advance carriage 45A (FIGS. 2 and 3), for example, the switch 1SD.

The relative motion of the carriages also moves the armature DMA toward the coil DMC to increase the impedance of the coil gradually. The increase in impedance of the coil results in a gradual decrease in current supplied to the winding PM1 (FIG. 13) of the pattern motor PM. The resultant movement of the lever 215 in a counterclockwise direction about its pivot 217 increases the effective resistance of the rheostat 239 and consequently reduces the excitation of the generator G. As a result, the elevator car is slowed gradually as it approaches the second floor.

When the car reaches a distance of the order of twenty inches from the second floor, the switches 11SD and 11SU (FIG. 12) close to energize the transfer relay TR. This relay opens its break contacts TR1 to interrupt the holding circuit for the down switch D and the car running relay 32. In addition, break contacts TR2 and TR3 (FIG. 13) open to interrupt the energization of the winding PM1 through the coil DMC. Closure of make contacts TR4 and TR5 connects the winding PM1 and the auxiliary brake relay BR for energization under control of the electromagnetic unit EU.

The down switch D in dropping out opens its make contacts D1, D2 (FIG. 13), D3 and D4 (FIG. 12) without immediately effecting the operation of the system. Opening of make contacts D6 and D7 results in deenergization of the armature of the advance motor AM. Dropout of the car running relay 32 is accompanied by opening of its make contacts 32–1 (FIG. 13), but the closure of make contacts BR1 of the auxiliary brake relay BR prevents application of the brake 7. Opening of make contacts 32–2 and 32–3 (FIG. 12) has no immediate effect on system operation.

When the transfer occurs, the electromagnetic unit EU (FIG. 1) is adjacent the upper end of the plate P for the second floor. In this position of the elevator car, the plate has little shielding action on the electromagnetic unit. Consequently, the rectifier 267 (FIG. 13) supplies substantial current whereas the rectifier 271 supplies a smaller current to the resistor 273. The resultant voltage across the resistor energizes the winding PM1 of the pattern motor PM with proper polarity for continued down travel of the elevator car. As the car continues its approach to the second floor, the plate P applies an increasing shielding action, and the voltage applied to the winding PM1 consequently decreases gradually. This means that the speed of the elevator car also is decreased gradually until the car reaches a position of registration with the second floor. At this point, the voltage across the resistor 273 is reduced to zero, and the speed of the elevator car also is reduced to zero. The auxiliary brake relay BR drops out to open its make contacts BR1, thus permitting application of the brake 7. The elevator car is retained accurately in registry with the second floor. Should the car be displaced from the second floor for any reason such as cable contraction or stretch, the electromagnetic unit EU would initiate return of the car into registry with the second floor, as will be understood by reference to the aforesaid Oplinger Patent 2,874,806.

During the final movement of the elevator car, the switch 4SD (FIG. 12) closed (such closure may occur when the car is two feet from the second floor). Such closure prepares the coil 193 for subsequent energization. In addition, the switch 1SD closed when the elevator car was within one foot of the second floor to prepare the up switch U for subsequent energization.

The elevator car attendant now opens his car gate and the hoistway door for the second floor to receive the waiting passenger. Such openings result in deenergization of the door relay 40. Opening of make contacts 40–1, 40–2, 40–3, 40–4 and 40–5 has no immediate effect on system operation. However, closure of break contacts 40–6 completes an energizing circuit for the coil 193. Upon being energized, the coil 193 releases the sprocket wheel 33 (FIGS. 2 and 3) and permits registration of the advance and synchronous carriages.

When the passenger has entered the elevator car, the car attendant operates the down push button DPB (FIG. 12) to effect movement of the car to the lower terminal or first floor by a sequence of operations which will be clear from the preceding discussion.

It should be noted that when the elevator car makes a short run, such as a run from the second to the first floor, the advance carriages may be brought to a stop before they reach their full advances. For examples, let it be assumed that the car attendant operates the car call push button 1C for the first floor. Following operation of the down push button DPB, the advance carriages start to advance in the manner previously described. However, if the first and second floors are separated by less than twenty feet, the advance carriages do not reach their full advances before the switch 49A(1)–1 associated with the floor-stop unit for the first floor is closed by the cam 109 (FIGS. 7 and 9). Closure of the switch 49A(1)–1 (FIG. 12) completes an energizing circuit for the down pawl relay DPL, and this relay operates in the manner previously described to bring the advance carriages to a stop.

If the first and second floors are spaced by say fifteen feet, the armature DMA (FIGS. 2 and 13) is not withdrawn completely from the coil DMC, and the coil will not have its minimum impedance. Consequently, the elevator car will not attain as high a speed during a short run as it does for a long run. With this exception, it will be appreciated that the system operates for a short run in a manner analogous to the operation of the system for a longer run. Since the electromagnetic unit EU (FIGS. 1 and 13) operates for a very limited travel of the elevator car, it is clear that it is always employed for controlling the car whether the car is operated on a run from one floor to the next floor or on a longer run. Consequently, it is always available for establishing an accurate slowdown pattern for the car as it nears the floor at which it is to stop.

Although the invention has been described with reference to certain specific embodiments thereof, numerous modifications falling within the spirit and scope of the invention are possible.

I claim as my invention:

1. In a floor selector for controlling operation of an elevator car serving a plurality of floors of a building structure, a carriage, a supporting structure having only a single guide rail for guiding said carriage along a predetermined path, a plurality of floor units spaced in the direction of said path and secured to said rail, roller means mounting said carriage on said rail for movement relative to said supporting structure along said path, said roller means comprising a first and a second roller spaced in the direction of said path and engaging a first side of said rail, said roller means also including a third roller engaging a second side of said rail opposite said first side, means mounting said first, second and third rollers on said carriage for rotation relative to said carriage and to said rail about spaced parallel respective first, second and third axes, said third axis being disposed on a first line drawn from said third axis to a second line transverse to said first line and extending between and transverse to said first and second axes, means biasing said third roller toward said first and second rollers, and translating means having a first component on each of said floor units and a second component on said carriage, said translating means being responsive under predetermined conditions to a predetermined position of said carriage relative to each of said floor units.

2. In a floor selector for controlling operation of an elevator car serving a plurality of floors of a building structure, a first carriage, a supporting structure having only a single guide rail for guiding said first carriage along a predetermined path, a plurality of floor units spaced in the direction of said path and secured to said rail, first roller means mounting said first carriage on said rail for movement relative to said supporting structure along said path, said first roller means comprising a first and a second roller spaced in the direction of said path and engaging a first side of said rail, said first roller means also including a third roller engaging a second side of said rail opposite said first side, means mounting said first, second and third rollers on said first carriage for rotation relative to said first carriage and to said rail about spaced parallel respective first, second and third axes, said third axis being disposed on a first line drawn from said third axis to a second line transverse to said first line and extending between and transverse to said first and second axes, means biasing said third roller toward said first and second rollers, a second carriage movable relative to said supporting structure, second roller means comprising a fourth and fifth roller spaced in the direction of said path and a sixth roller spaced from said fourth and fifth rollers, means mounting said fourth, fifth and sixth rollers on said first carriage for rotation relative to said first and second carriages about spaced respective fourth, fifth and sixth axes parallel to said first, second and third axes, said sixth axis being disposed on a third line drawn from said sixth axis to a fourth line transverse to said third line and extending between and transverse to said fourth and fifth axes, means biasing said sixth roller toward said fourth and fifth rollers, said fourth, fifth and sixth rollers each having a portion cooperating with a portion of said second carriage to mount said second carriage on said first carriage for movement in accordance with said first carriage and for limited movement relative to said first carriage in the direction of said path, first translating means having a first component on each of said floor units and a second component on said first carriage, said first translating means being responsive under predetermined conditions to predetermined position of said first carriage relative to each of said floor units, and second translating means having one component on said first carriage and another component on said second carriage, said second translating means being responsive in the presence of said predetermined conditions to a predetermined positioning of said second carriage relative to said first carriage.

3. In a floor selector for controlling operation of an elevator car serving a plurality of floors of a building structure, a carriage, a supporting structure having only a single guide rail for guiding said carriage along a predetermined path, a plurality of floor units spaced in the direction of said path and secured to said rail, said rail having a pair of longitudinally extending grooves disposed in opposite sides thereof, roller means mounting said carriage on said rail for movement relative to said supporting structure along said path while preventing rotation of the carriage about said rail, said roller means comprising a first and a second roller disposed in a first of said grooves, said roller means also including a third roller disposed in the second of said grooves, means mounting said first, second and third rollers on said carriage for rotation relative to said carriage and to said rail about spaced parallel respective first, second and third axes, said third axis being disposed on a first line drawn from said third axis to a second line transverse to said first line and extending between and transverse to said first and second axes, means biasing said third roller toward said first and second rollers, and translating means having a first component on each of said floor units and a second component on said carriage, said translating means being responsive under predetermined conditions to a predetermined position of said carriage relative to each of said floor units.

4. In a floor selector for controlling operation of an elevator car serving a plurality of floors of a building structure, a first carriage comprising a first plate, a supporting structure having only a single guide rail extending in a direction parallel to said first plate for guiding said first carriage along a predetermined path, a plurality of floor units spaced in the direction of said path and secured to said rail, said rail having a pair of longitudinally extending grooves disposed in opposite sides thereof, first roller means mounting said first carriage on said rail for movement relative to said supporting structure along said path, said first roller means comprising a first and a second roller disposed in a first of said grooves, said first roller means also including a third roller disposed in the second of said grooves, means mounting said first, second and third rollers on said first plate for rotation relative to said first carriage and to said rail about spaced parallel respective first, second and third axes transverse to said first plate, said third axis being disposed on a first line drawn from said third axis to a second line transverse to said first line and extending between and transverse to said first and second axes, means biasing said third roller toward said fist and second rollers, a second carriage movable relative to said supporting structure and comprising a second plate parallel to and spaced from said first plate, second roller means comprising a fourth and a fifth roller spaced in the direction of said path and a sixth roller spaced from said fourth and fifth rollers, means mounting said fourth, fifth and sixth rollers on said first plate for rotation relative to said first carriage and to said second plate about spaced parallel respective fourth, fifth and sixth axes transverse to said first plate, said sixth axis being disposed on a third line drawn from said sixth axis to a fourth line transverse to said third line and extending between and transverse to said fourth and fifth axes, means biasing said sixth roller toward said fourth and fifth rollers, each of said fourth, fifth and sixth rollers having a peripheral groove for receiving an edge portion of said second plate to mount said second carriage on said first carriage for movement in accordance with said first carriage and for limited movement relative to said first carriage in the direction of said path, first translating means having a first component on each of said floor units and a second component on said first plate said first translating means being responsive under predetermined conditions to a predetermined position of said first carriage relative to each of said floor units, and second translating means having one component on said first plate and another component on said second plate, said second translating means being responsive in the presence of said predetermined conditions to a predetermined positioning of said second carriage relative to said first carriage.

5. In a floor selector for controlling operation of an elevator car serving a plurality of floors of a building structure, a first carriage comprising a first plate, a supporting structure having only a single guide rail extending in a direction parallel to said first plate for guiding said first carriage along a predetermined path, a plurality of floor units spaced in the direction of said path and secured to said rail, said rail having a pair of longitudinally extending grooves disposed in opposite sides thereof, first roller means mounting said first carriage on said rail for movement relative to said supporting structure along said path, said first roller means comprising a first and a second roller disposed in a first of said grooves, said first roller means also including a third roller disposed in the second of said grooves, means mounting said first, second and third rollers on a first side of said first plate for rotation relative to said first carriage and to said rail about spaced parallel respective first, second and third axes transverse to said first plate, said third axis being disposed on a first line drawn from said third axis to a second line transverse to said first line and extending between and transverse to said first and second axes, means biasing said third roller toward said first and second rollers, a second carriage movable relative to said supporting structure and comprising a second plate parallel to and spaced from said first plate, second roller means comprising a fourth and a fifth roller spaced in the direction of said path and a sixth roller spaced from said fourth and fifth rollers, means mounting said fourth, fifth and sixth rollers on a second side of said first plate opposite said first side for rotation relative to said first carriage and to said second plate about spaced parallel respective fourth, fifth and sixth axes transverse to said first plate, said sixth axis being disposed on a third line drawn from said sixth axis to a fourth line transverse to said third line and extending between and transverse to said fourth and fifth axes, means biasing said sixth roller toward said fourth and fifth rollers, each of said fourth, fifth and sixth rollers having a peripheral groove for receiving an edge portion of said second plate to mount said second carriage on said first carriage for movement in accordance with said first carriage and for limited movement relative to said first carriage in the direction of said path, first translating means having a first component on each of said floor units and a second component on said first plate, said first translating means being responsive under predetermined conditions to a predetermined position of said first carriage relative to each of said floor units, and second translating means comprising a cam body mounted on said second plate for movement with said second carriage, a third plate spaced from said first and second plates, means mounting said third plate on said second side of said first plate and parallel to said first and second plates, and switch means mounted on said third plate for operation by said cam body during movement of said second carriage relative to said first carriage in the presence of said predetermined conditions.

6. In a floor selector for controlling operation of an elevator car serving a plurality of floors of a building structure, a first carriage comprising a first plate, a supporting structure having only a single guide rail extending in a direction parallel to said first plate for guiding said first carriage along a predetermined path, a plurality of floor units spaced in the direction of said path and secured to said rail, said rail having a pair of longitudinally extending grooves disposed in opposite sides thereof, first roller means mounting said first carriage on said rail for movement relative to said supporting structure along said path, said first roller means comprising a first and a second roller disposed in a first of said grooves, said first roller means also including a third roller disposed in the second of said grooves, means mounting said first, second and third rollers on a first side of said first plate for rotation relative to said first carriage and to said rail about spaced parallel respective first, second and third axes transverse to said first plate, said third axis being disposed on a first line drawn from said third axis to a second line transverse to said first line and extending between and transverse to said first and second axes, means biasing said third roller toward said first and second rollers, a second carriage movable relative to said supporting structure and comprising a second plate parallel to and spaced from said first plate, second roller means comprising a fourth and a fifth roller spaced in the direction of said path and a sixth roller spaced from said fourth and fifth rollers, means mounting said fourth, fifth and sixth rollers on a second side of said first plate opposite said first side for rotation relative to said first carriage and to said second plate about spaced parallel respective fourth, fifth and sixth axes transverse to said first plate, said sixth axis being disposed on a third line drawn from said sixth axis to a fourth line transverse to said third line and extending between and transverse to said fourth and fifth axes, means biasing said sixth roller toward said fourth and fifth rollers, each of said fourth, fifth and sixth rollers having a peripheral groove for receiving an edge portion of said second plate to mount said second carriage on said first carriage for movement in accordance with said first carriage and for limited movement relative to said first carriage in the direction of said path, first translating means having a first component on each of said floor units and a second component on said first plate, said first translating means being responsive under predetermined conditions to a predetermined position of said first carriage relative to each of said floor units, and second translating means comprising a cam body mounted on said second plate for movement with said second carriage, a third plate spaced from said first and second plates, means mounting said third plate on said second side of said first plate and parallel to said first and second plates, a second plate being disposed between said first and third plates, switch means carried by said third plate for operation by said cam body during movement of said second carriage relative to said first carriage in the presence of said predetermined conditions, said third plate having a first slot elongated in the direction of said path for enabling said switch means to be located along said first slot in any of a plurality of positions relative to said cam body, and means for securing said switch means to said third plate in a selected one of said positions, a stop carried by said third plate for engaging said cam body during movement of said first carriage relative to said second carriage in a first direction for limiting such relative movement, said third plate having a second slot elongated in the direction of said path for enabling said stop to be located along said second slot in any of a plurality of positions relative to said cam body, and means for securing said stop to said third plate in a selected one of such positions.

7. In a floor selector for controlling operation of an elevator car serving a plurality of floors of a building structure, a first carriage comprising a first plate, a supporting structure having a guide rail extending in a direction parallel to said first plate for guiding said first carriage along a predetermined path, a plurality of floor units spaced in the direction of said path and secured to said rail, means mounting said first carriage on said rail for movement relative to said supporting structure along said path, a second carriage movable relative to said supporting structure and comprising a second plate parallel to and spaced from said first plate, means mounting said second plate on said first plate for movement of said second carriage in accordance with said first carriage and for limited movement of said second carriage relative to said first carriage in the direction of said path, first translating means having a first component on each of said floor units and a second component on said first plate, said first translating means being responsive under predetermined conditions to a predetermined position of said first carriage relative to each of said floor units, and second translating means comprising a cam body mounted on said second plate for movement with said second carriage, a third plate spaced from said first and second plates, means mounting said third plate on said first plate parallel to said first and second plates, and switch means mounted on said third plate for operation by said cam body during movement of said second carriage relative to said first carriage in the presence of said predetermined conditions.

8. In a floor selector for controlling operation of an elevator car serving a plurality of floors of a building structure, a first carriage comprising a first plate, a supporting structure having a guide rail extending in a direction parallel to said first plate for guiding said first carriage along a predetermined path, a plurality of floor units spaced in the direction of said path and secured to said rail, means mounting said first carriage on said rail for movement relative to said supporting structure along said path with a first side of said first plate adjacent said rail, a second carriage movable relative to said supporting structure and comprising a second plate parallel to and spaced from said first plate, means mounting said second plate on a second side of said first plate opposite said first side for movement of said second carriage in accordance with said first carriage and for limited movement of said second carriage relative to said first carriage in the direction of said path, first translating means having a first component on each of said floor units and a second component on said first plate, said first translating means being responsive under predetermined conditions to a predetermined position of said first carriage relative to each of said floor units, and second translating means comprising a cam body mounted on said second plate for movement with said second carriage, a third plate spaced from said first and second plates, means mounting said third plate on said second side of said first plate and parallel to said first and second plates, said second plate being disposed between said first and third plates, switch means carried by said third plate for operation by said cam body during movement of said second carriage relative to said first carriage in the presence of said predetermined conditions, and a stop carried by said third plate for engaging said cam body during movement of said first carriage relative to said second carriage in a first direction for limiting such relative movement.

9. In a floor selector for controlling operation of an elevator car serving a plurality of floors of a building structure, a first carriage comprising a first plate, a supporting structure having a unitary guide rail having a non-cylindrical cross-section extending in a direction parallel to said first plate for guiding said first carriage along a predetermined path, a plurality of floor units spaced in the direction of said path and secured to said rail, means mounting said first carriage on said rail for movement relative to said supporting structure along said path with a first side of said first plate adjacent said rail, said guide rail constituting the sole means for guiding said carriages along said path, said carriage and guide rail being configured to prevent relative rotation therebetween about the line of said path, a second carriage movable relative to said supporting structure and comprising a second plate parallel to and spaced from said first plate, means mounting said second plate on a second side of said first plate opposite said first side for movement of said second carriage in accordance with said first carriage and for limited movement of said second carriage relative to said first carriage in the direction of said path, first translating means having a first component on each of said floor units and a second component on said first plate, said first translating means being responsive under predetermined conditions to a predetermined position of said first carriage relative to each of said floor units, and second translating means comprising a cam body mounted on said second plate for movement with said second carriage, a third plate spaced from said first and second plates, means mounting said third plate on said second side of said first plate and parallel to said first and second plates, said second plate being disposed between said first and third plates, said cam body being disposed between said second and third plates, switch means carried by said third plate, said third plate having a first slot elongated in the direction of said path for enabling said switch means to be located along said first slot in any of a plurality of positions relative to said cam body, and means for securing said switch means to said third plate in a selected one of said positions, said switch means having a cam follower disposed between said third plate and said second plate for engagement by said cam body to operate said switch means during movement of said second carriage relative to said first carriage in the presence of said predetermined conditions, a stop carried by said third plate, said third plate having a second slot elongated in the direction of said path for enabling said stop to be located along said second slot in any of a plurality of positions relative to said cam body, and means for securing said stop to said third plate in a selected one of such positions with said stop being disposed between said second and third plates for engagement by said cam body during movement of said first carriage relative to said second carriage in a first direction for limiting such relative movement.

10. In a floor selector for controlling operation of an elevator car serving a plurality of floors of a building structure, a carriage, a supporting structure having only a single unitary guide rail for guiding said carriage along a predetermined path, a plurality of floor units spaced in the direction of said path and secured to said rail, mounting means mounting said carriage on said rail for movement relative to said supporting structure along said path, said mounting means including first and second portions respectively disposed to engage opposite first and second sides of said rail, said rail and mounting means being configured to prevent rotation of the carriage relative to the rail about the line of said path, and translating means having a first component on each of said floor units and a second component on said carriage, said translating means being responsive under predetermined conditions to a predetermined position of said carriage relative to each of said floor units.

11. In a floor selector for controlling operation of an elevator car serving a plurality of floors of a building structure, a carriage, a supporting structure having only a single unitary guide rail for guiding said carriage along a predetermined path, a plurality of floor units spaced in the direction of said path and secured to said rail, three-point contact mounting means mounting said carriage on said rail for movement relative to said supporting structure along said path, said mounting means comprising first and second spaced portions disposed to engage a first side of said rail and a third portion spaced from said first and second portions and disposed to engage a second side of said rail opposite said first side, said rail and mounting means being configured to prevent rotation of the carriage relative to the rail about the line of said path, means biasing said third portion toward said second and third portions, and translating means having a first component on each of said floor units and a second component on said carriage, said translating means being responsive under predetermined conditions to a predetermined position of said carriage relative to each of said floor units.

12. In a floor selector for controlling operation of an elevator car serving a plurality of floors of a building structure, a carriage, a supporting structure having only a single guide rail for guiding said carriage along a predetermined path, a plurality of floor units spaced in the direction of said path and secured to said rail, a plurality of rollers mounting said carriage on said rail for movement relative to said supporting structure along said path, means mounting said rollers on said carriage for rotation relative to said carriage and to said rail about spaced parallel respective axes, a first portion of said rollers being disposed to engage a first side of said rail, a second portion of said rollers being disposed to engage a second side of said rail opposite said first side, drive means independent of said rollers for moving the carriage along said path relative to the rail, and translating means having a first component on each of said floor units and a second component on said carriage, said translating means being responsive under predetermined conditions to a predetermined position of said carriage relative to each of said floor units.

13. In a floor selector for controlling operation of an elevator car serving a plurality of floors of a building structure, a carriage, a supporting structure having only a single guide rail for guiding said carriage along a predetermined path, a plurality of floor units spaced in the direction of said path and secured to said rail, a plurality of rollers mounting said carriage on said rail for movement relative to said supporting structure along said path, said rail and rollers being configured to prevent relative rotation of the carriage about the rail, means mounting said rollers on said carriage for rotation relative to said carriage and to said rail about spaced parallel respective axes, a first portion of said rollers being disposed to engage a first side of said rail, a second portion of said rollers being disposed to engage a second side of said rail opposite said first side, means biasing said first and second portions of said rollers toward each other, and translating means having a first component on each of said floor units and a second component on said carriage, said translating means being responsive under predetermined conditions to a predetermined position of said carriage relative to each of said floor units.

14. In a floor selector for controlling operation of an elevator car serving a plurality of floors of a building structure, a first carriage, a supporting structure having only a single guide rail for guiding said first carriage along a predetermined path, a plurality of floor units spaced in the direction of said path and secured to said rail, said first carriage having first three-point contact mounting means mounting said first carriage on said rail for movement relative to said supporting structure along said path, said first mounting means comprising first and second spaced portions disposed to engage a first side of said rail and a third portion spaced from said first and second portions and disposed to engage a second side of said rail opposite said first side, said rail and mounting means being configured to prevent rotation of the carriage relative to the rail about the line of said path, means biasing said third portion toward said first and second portions, a second carriage movable relative to said supporting structure, said first carriage also having second three-point contact mounting means mounting said second carriage on said first carriage for movement in accordance with said first carriage and for limited movement relative to said first carriage in the direction of said path, said second mounting means comprising first and second spaced portions disposed to engage a first part of said second carriage and a third portion spaced from such first and second portions and disposed to engage a second part of said second carriage opposite said first part, means biasing the third portion of said second mounting means toward the first and second portions thereof, first translating means having a first component on each of said floor units and a second component on said first carriage, said first translating means being responsive under predetermined conditions to a predetermined position of said first carriage relative to each of said floor units, and second translating means having one component on said first carriage and another component on said second carriage, said second translating means being responsive in the presence of said predetermined conditions to a predetermined positioning of said second carriage relative to said first carriage.

15. In a floor selector for controlling operation of an elevator car serving a plurality of floors of a building structure, a first carriage, a supporting structure having only a single guide rail for guiding said first carriage along a predetermined path, a plurality of floor units spaced in the direction of said path and secured to said rail, a plurality of first rollers mounting said first carriage on said rail for movement relative to said supporting structure along said path, means mounting said first rollers on said first carriage for rotation relative to said first carriage and to said rail about spaced parallel respective first axes, a first portion of said first rollers being disposed to engage a first side of said rail, a second portion of said first rollers being disposed to engage a second side of said rail opposite said first side, a second carriage movable relative to said supporting structure, a plurality of second rollers mounting said second carriage on said first carriage, means mounting said second rollers on said first carriage for rotation relative to said first and second carriages about spaced respective second axes parallel to said first axes, a first portion of said second rollers being disposed to engage a first part of said second carriage and a second portion of said second rollers being disposed to engage a second part of said second carriage opposite said first part for mounting said second carriage on said first carriage for movement in accordance with said first carriage and for limited movement relative to said first carriage in the direction of said path, first translating means having a first component on each of said floor units and a second component on said first carriage, said first translating means being responsive under predetermined conditions to a predetermined position of said first carriage relative to each of said floor units, and second translating means having one component on said first carriage and another component on said second carriage, said second translating means being responsive in the presence of said predetermined conditions to a predetermined positioning of said second carriage relative to said first carriage.

16. In a floor selector for controlling operation of an elevator car serving a plurality of floors of a building structure, a first carriage, a supporting structure having only a single guide rail for guiding said first carriage along a predetermined path, a plurality of floor units spaced in the direction of said path and secured to said rail, a plurality of first rollers mounting said first carriage on said rail for movement relative to said supporting structure along said path, means mounting said first rollers on said first carriage for rotation relative to said first carriage and to said rail about spaced parallel respective first axes, a first portion of said first rollers being disposed to engage a first side of said rail, a second portion of said first rollers being disposed to engage a second side of said rail opposite said first side, means biasing said first and second portions of said first rollers toward each other, a second carriage movable relative to said supporting structure, a plurality of second rollers mounting said second carraige on said first carriage, means mounting said second rollers on said first carriage for rotation relative to said first and second carriages about spaced respective second axes parallel to said first axes, a first portion of said second rollers being disposed to engage a first part of said second carriage and a second portion of said second rollers being disposed to engage a second part of said second carriage opposite said first part for mounting said second carriage on said first carriage for movement in accordance with said first carriage and for limited movement relative to said first carriage in the direction of said path, means biasing said first and second portions of said second rollers toward each other, first translating means having a first component on each of said floor units and a second component on said first carriage, said first translating means being responsive under predetermined conditions to a predetermined position of said first carriage relative to each of said floor units, and second translating means having one component on said first carriage and another component on said second carriage, said second translating means being responsive in the presence of said predetermined conditions to a predetermined positioning of said second carriage relative to said first carriage.

17. In a floor selector for controlling operation of an elevator car serving a plurality of floors of a building structure, an elongated supporting member having a uniform cross-section, a plurality of floor units distributed along said supporting member, each of said floor units comprising a releasable clamp engaging said supporting member, said clamp having first and second oppositely disposed spaced legs and a body portion joining said legs with the exposed ends of said legs facing one another to provide a generally C-shaped configuration forcing the clamp into a predetermined orientation in a direction transverse to said supporting member, said supporting member having first and second oppositely disposed longitudinally extending shoulders and a longitudinally extending notch adjacent said first shoulder to provide a major dimension between the outermost ends of said shoulders and a minor dimension between the innermost end of said second shoulder and the innermost surface of said notch, the spacing between the exposed ends of said clamp legs providing a clamp opening greater than said minor dimension but less than said major dimension for permitting reception of said shoulders within said clamp by insertion of said first shoulder into said clamp opening and of said first clamp leg into said notch, rotation of said clamps relative to said supporting member for passing the exposed end of said second shoulder, and movement of said clamp transversely of said supporting member in a direction opposite the direction of insertion of said first leg into said notch to a mounting position presenting said major dimension to said opening, said clamp including releasable clamping means cooperating with said C-shaped configuration for securing the clamp to said supporting member in said mounting position, each of said clamps when released permitting adjustment of the respective floor unit in a direction parallel to said supporting member, switch means carried by each of said clamps, a control element, and means mounting the control element for movement parallel to the supporting member for operating the switch means of each of the the floor units.

18. In a floor selector for controlling operation of an elevator car serving a plurality of floors of a building structure, an elongated supporting member having a uniform cross-section, a plurality of floor units distributed along said supporting member, each of said floor units comprising a releasable clamp engaging said supporting member, said clamp having first and second oppositely disposed spaced legs and a body portion joining said legs with the exposed ends of said legs facing one another to provide a generally C-shaped configuration forcing the clamp into a predetermined orientation in a direction transverse to said supporting member, said supporting member having first and second oppositely disposed longitudinally extending shoulders and a longitudinally extending notch adjacent said first shoulder to provide a major dimension between the outermost ends of said shoulders and a minor dimension between the innermost end of said second shoulder and the innermost surface of said notch, the spacing between the exposed ends of said clamp legs providing a clamp opening greater than said minor dimension but less than said major dimension for permitting reception of said shoulders within said clamp by insertion of said first shoulder into said clamp opening and of said first clamp leg into said notch, rotation of said clamp relative to said supporting member for passing the exposed end of said second clamp leg around the outermost end of said second shoulder, and movement of said clamp transversely of said supporting member in a direction opposite the direction of insertion of said first leg into said notch to a mounting position presenting said major dimension to said opening, said clamp having an obliquely disposed releasable clamping member, said supporting member having a longitudinally extending oblique surface cooperable with said clamping member, means for adjusting said clamping member against said oblique surface to draw said first leg against said first shoulder and said second leg against said second shoulder and to force the exposed end of said second leg against said supporting member with the exposed end of said first leg facing said notch, whereby said clamp is secured to said supporting member in said mounting position, each of said clamping members when released permitting adjustment of the respective floor unit in a direction parallel to said supporting member, switch means carried by each of said clamps, a control element, and means mounting the control element for movement parallel to the supporting member for operating the switch means of each of the floor units.

19. In a floor selector for an elevator system,
a first track unit,
a second track unit,
a first carriage mounted on the first track unit for reciprocation in a first line along the first track unit independently of the second track unit, a second carriage mounted on the second track unit for reciprocation in a second line along the second track unit independently of the first track unit, means operable for moving said carriages relative to the respective track units, first control means responsive to movement of the first carriage to a predetermined position relative to the first track unit, and second control means responsive to movement of the second carriage to a predetermined position relative to the second track unit; each of said track units comprising an integral rail having a non-circular cross-section and having a pair of spaced guide surfaces parallel to the associated one of said lines, each of said carriages having separate guide means positioned to engage each of the associated pair of guide surfaces, the guide means of each of said carriages being biased relative to each other to urge each of the guide means against its associated guide surface, each of said non-circular rails and the associated guide means coacting to prevent rotation of each of said carriages about the associated one of said rails.

References Cited in the file of this patent
UNITED STATES PATENTS

| | | |
|---|---|---|
| 2,039,568 | Tamsitt | May 5, 1936 |
| 2,148,913 | Stevens | Feb. 28, 1939 |
| 2,482,458 | Bouton | Sept. 20, 1949 |
| 2,657,765 | Sarage | Nov. 3, 1953 |
| 2,788,089 | Lund | Apr. 9, 1957 |
| 2,874,806 | Oplinger | Feb. 24, 1959 |